US012541161B2

(12) United States Patent
Takeuchi

(10) Patent No.: US 12,541,161 B2
(45) Date of Patent: Feb. 3, 2026

(54) IMAGE FORMING APPARATUS

(71) Applicant: CANON KABUSHIKI KAISHA, Tokyo (JP)

(72) Inventor: Yasushi Takeuchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/763,187

(22) Filed: Jul. 3, 2024

(65) Prior Publication Data

US 2025/0013175 A1 Jan. 9, 2025

(30) Foreign Application Priority Data

Jul. 4, 2023 (JP) ................................ 2023-110364

(51) Int. Cl.
*G03G 15/16* (2006.01)
*G03G 15/01* (2006.01)

(52) U.S. Cl.
CPC ..... *G03G 15/1675* (2013.01); *G03G 15/0131* (2013.01); *G03G 15/0189* (2013.01)

(58) Field of Classification Search
CPC ........... G03G 15/0131; G03G 15/0189; G03G 15/1605; G03G 15/1675; G03G 15/169
See application file for complete search history.

(56) References Cited

U.S. PATENT DOCUMENTS

2006/0209151 A1* 9/2006 Tamiya .................. B41J 2/0057 347/103
2008/0213010 A1* 9/2008 Oyama .............. G03G 15/1675 399/313
2024/0168414 A1* 5/2024 Kobayashi ........... G03G 15/162
2024/0288801 A1* 8/2024 Tanaka ................ G03G 15/161

FOREIGN PATENT DOCUMENTS

JP 2003-057963 A 2/2003
JP 2007-264152 A 10/2007
JP 2009-053272 A 3/2009

* cited by examiner

*Primary Examiner* — Carla J Therrien
(74) *Attorney, Agent, or Firm* — Venable LLP

(57) ABSTRACT

An image forming apparatus includes a photosensitive member, an intermediary transfer belt, a primary transfer member, an electrode member, a first applying portion configured to apply, to the primary transfer member, a bias of a polarity opposite to a predetermined polarity, a second applying portion configured to apply, to the electrode member, a bias of the same polarity as the predetermined polarity, and a controller configured to control the second applying portion so as to change the bias applied to the electrode member on the basis of a kind of a recording material.

11 Claims, 22 Drawing Sheets

IMAGE FORMING APPARATUS

FIELD OF THE INVENTION AND RELATED ART

The present invention relates to an image forming apparatus such as a copying machine, a printer, a facsimile machine, or a multi-function machine having a plurality of functions of these machines, of an electrophotographic type or an electrostatic recording type.

As an image forming apparatus, such as a color copying machine, a color printer, or a color multi-function machine, the electrophotographic type, an image forming apparatus of an intermediary transfer type has become mainstream since the image forming apparatus has advantages such that downsizing of an apparatus main assembly and adaptation to various recording materials are relatively easy. The image forming apparatus of the intermediary transfer type includes, in general, a plurality of photosensitive drums and an intermediary transfer belt. Further, toner images formed on the photosensitive drums are electrostatically primary transferred successively onto the intermediary transfer belt in a primary transfer portion. Further, the toner images primary transferred on the intermediary transfer belt are electrostatically secondary transferred onto a recording material such as paper in a secondary transfer portion. Incidentally, as regards arrangement of members around the primary transfer portion and the like, "upstream" and "downstream" refer to "upstream" and "downstream", respectively, with respect to a conveying direction of the intermediary transfer belt.

In such an image forming apparatus, the toner on the intermediary transfer belt has a tendency that on a side downstream of the primary transfer portion, the toner is subjected to electric discharge between the intermediary transfer belt and the photosensitive drum and is increased in charge amount. Then, when the present inventor has proceeded with study, it turned out that a mirror force between the toner and the intermediary transfer belt increased by the increase in charge amount and thus it became difficult to transfer the toner onto the recording material in the secondary transfer portion. For example, uniform transfer of the toner onto embossed paper with surface unevenness is difficult since a gap is generated between the intermediary transfer belt and the recording material in the secondary transfer portion and a relatively large secondary transfer electric field is required. For that reason, when the charge amount of the toner on the intermediary transfer belt is increased, the uniform transfer onto the embossed paper with surface unevenness becomes further difficult. Further, as regards a secondary color toner image, when a toner image transferred on the intermediary transfer belt in an upstream side primary transfer portion passes through a downstream side primary transfer portion, the toner image is further subjected to the electric discharge. For that reason, a difference in charge amount of the toner on the intermediary transfer belt is generated between the secondary color and a single color (monochrome), whereby it becomes difficult to set a secondary transfer bias suitable for secondary transfer (a secondary transfer latitude becomes narrow) in some instances.

Here, in Japanese Laid-Open Patent Application (JP-A) No. 2003-57963, a constitution in which an electroconductive contact plate is provided on a side downstream of the primary transfer portion and on an inner peripheral surface side of the intermediary transfer belt and in which a bias of the same polarity as a charge polarity of the photosensitive drum is applied to the contact plate is disclosed.

In order to suppress the increase in charge amount of the toner on the side downstream of the primary transfer portion as described above, suppression of the electric discharge on the side downstream of the primary transfer portion is effective.

JP A No. 2003 57963 is silent about the suppression of the electric discharge on the side downstream of the primary transfer portion. However, when the present inventor has proceeded with study, in order to suppress the electric discharge on the side downstream of the primary transfer portion, it turned out that it is effective that a potential regulating member, which is an electroconductive electrode member, is provided on the side downstream of the primary transfer portion and on the inner peripheral surface side and then a bias (potential regulating bias) of the same polarity as the charge polarity of the photosensitive drum is applied to the potential regulating member.

By suppressing the electric discharge between the intermediary transfer belt and the photosensitive drum on the side downstream of the primary transfer portion, the increase in charge amount of the toner on the intermediary transfer belt can be suppressed, and for example, the uniform transfer of the toner onto the embossed paper with surface unevenness or the like can be made easy. Further, the difference in charge amount of the toner becomes small between the secondary color and the single color or the like, so that it becomes easy to ensure the secondary transfer latitude.

However, recently diversification of kinds of recording materials has advanced, and particularly in the commercial printing industry, not only plain paper but also coated paper low in surface unevenness by being coated with a coating agent and synthetic paper using a base material of a resin type are used in many instances. Such coated paper and synthetic paper are high in electric resistance value (volume resistivity) compared with the plain paper by the influence of a material used for surface treatment or the material used as the base material in general. In the case where such a recording material is used, in order to ensure a secondary transfer property, there is a tendency that a secondary transfer bias is set high (large in absolute value). For that reason, when the potential regulating bias applied to the potential regulating member becomes insufficient, an effect of suppressing the increase in charge amount of the toner becomes insufficient, so that a phenomenon such that the toner is scattered by an electric field in the secondary transfer portion (or in the neighborhood of an upstream side thereof) (herein, this phenomenon is simply referred to as "scattering (phenomenon)") is liable to occur in some instances. Further, in the case where smoothness of the recording material is high, a phenomenon such that the toner image is disturbed by rubbing between the intermediary transfer belt and the recording material in a state in which a retaining force of the toner on the intermediary transfer belt lowers (herein, this phenomenon is simply referred to as "image disturbance") is liable to occur in some instances.

SUMMARY OF THE INVENTION

A principal object of the present invention is to suppress image defect such as scattering capable of occurring depending on a kind of a recording material in a constitution in which an increase in charge amount of toner on an intermediary transfer member is capable of being suppressed by applying a bias to an electrode member provided downstream of a primary transfer portion.

This object is achieved by an image forming apparatus according to the present invention.

According to an aspect of the present invention, there is provided an image forming apparatus comprising: a photosensitive member electrically charged to a predetermined polarity and configured to carry a toner image; an intermediary transfer belt onto which the toner image is transferred from the photosensitive member in a primary transfer portion; a primary transfer member forming the primary transfer portion, where the photosensitive member and the intermediary transfer belt contact each other, in contact with an inner peripheral surface of the intermediary transfer belt and configured to transfer the toner image from the photosensitive member onto the intermediary transfer belt under application of a transfer bias; an electrode member contacting the inner peripheral surface of the intermediary transfer belt on a side downstream of the primary transfer portion with respect to a movement direction of the intermediary transfer belt; a first applying portion configured to apply, to the primary transfer member, a bias of a polarity opposite to the predetermined polarity; a second applying portion configured to apply, to the electrode member, a bias of the same polarity as the predetermined polarity; and a controller configured to control the second applying portion so as to change the bias applied to the electrode member on the basis of a kind of a recording material.

Further features of the present invention will become apparent from the following description of exemplary embodiments with reference to the attached drawings.

Figure 3:
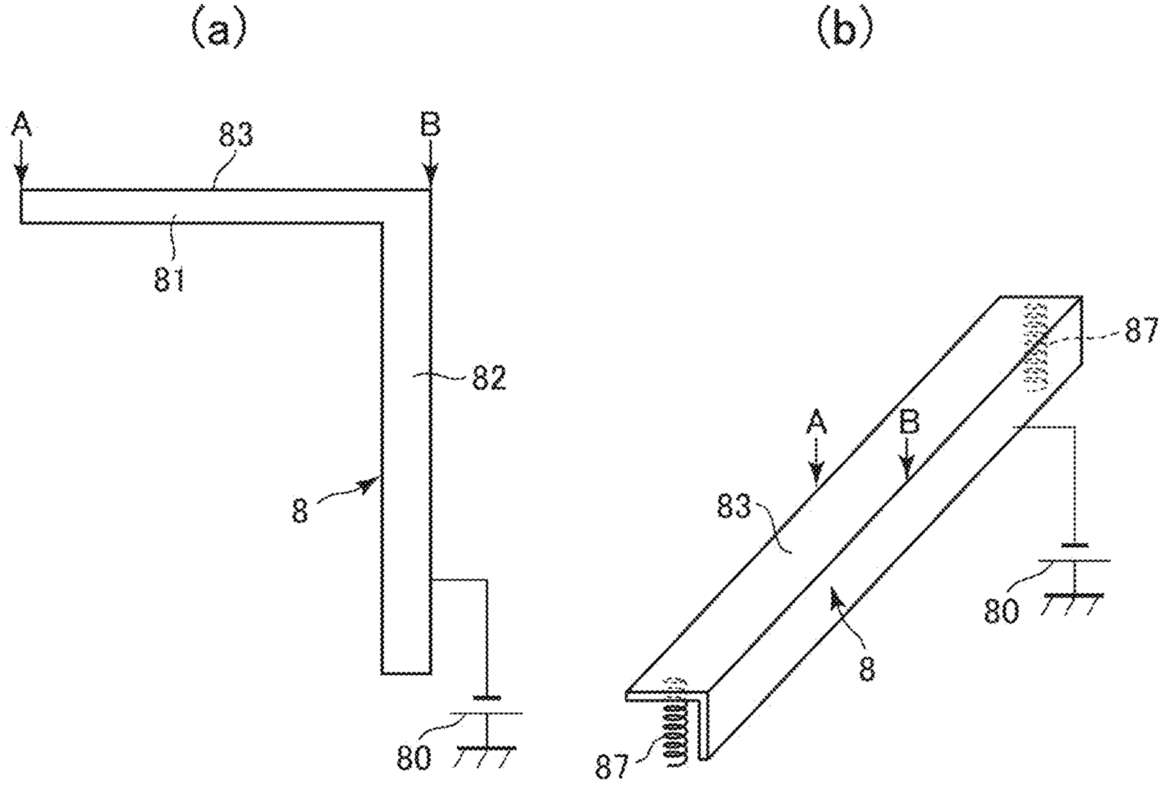

Parts (a) and (b) of FIG. 3 are a sectional view and a perspective view, respectively, of a potential regulating member.

Figure 4:
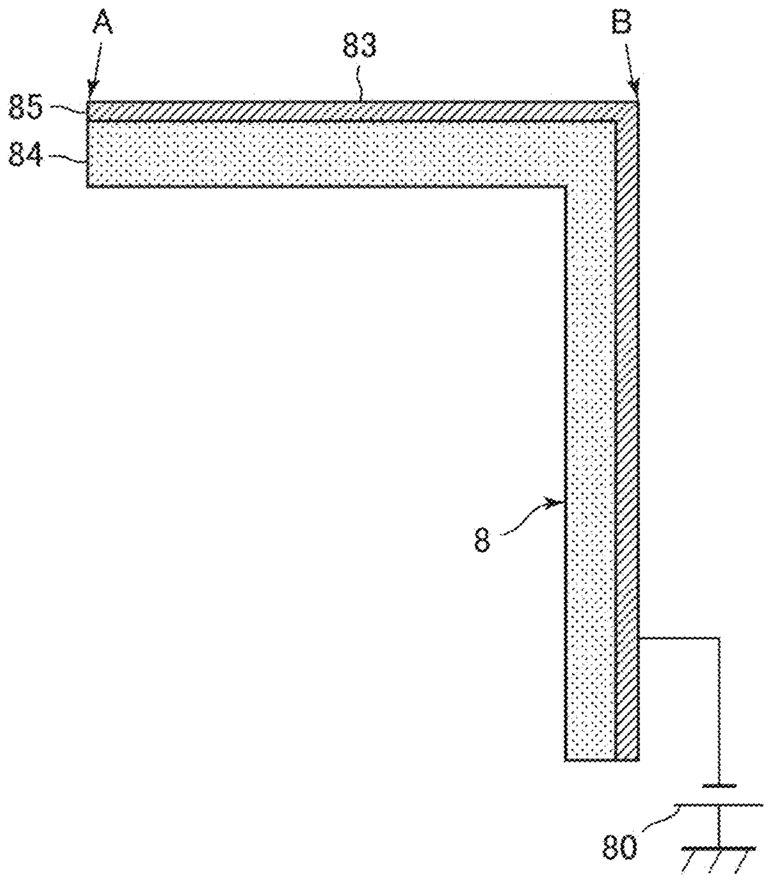

FIG. 4 is a sectional view of the potential regulating member in another example.

Figure 5:
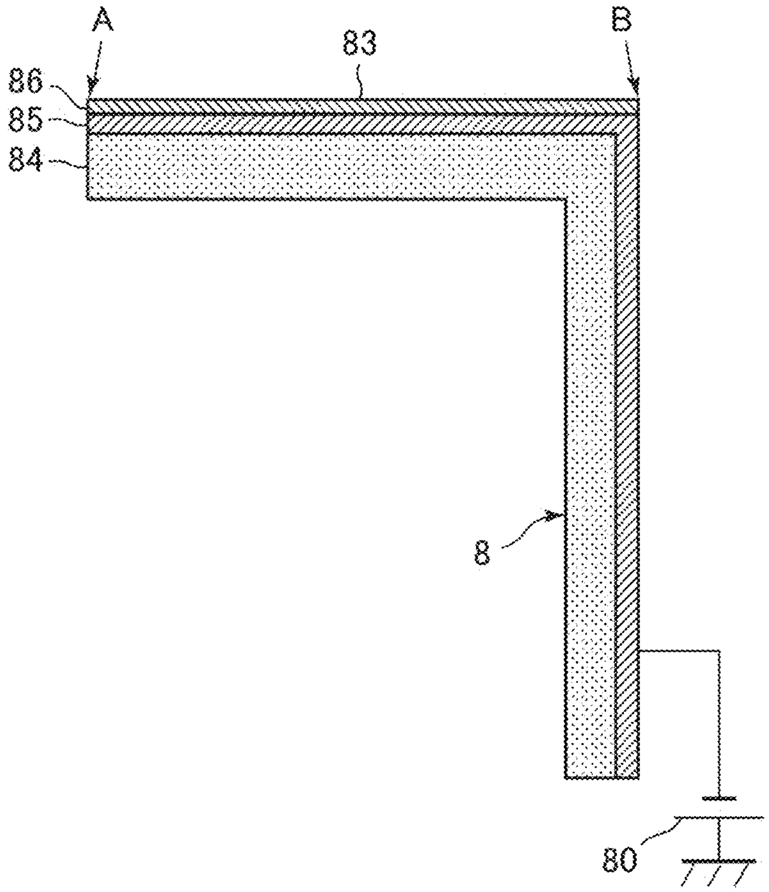

FIG. 5 is a sectional view of the potential regulating member in another example.

Figure 6:
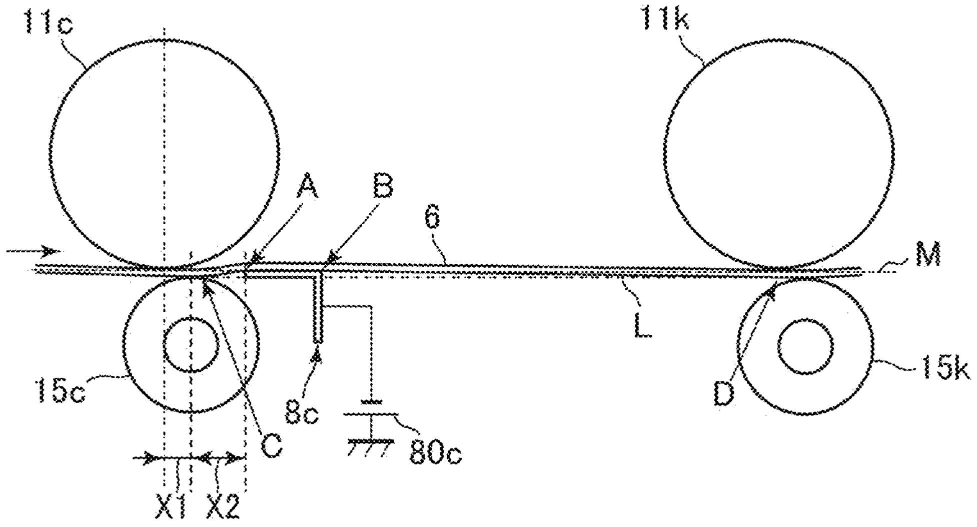

FIG. 6 is a sectional view for illustrating an arrangement of the potential regulating member.

Figure 7:
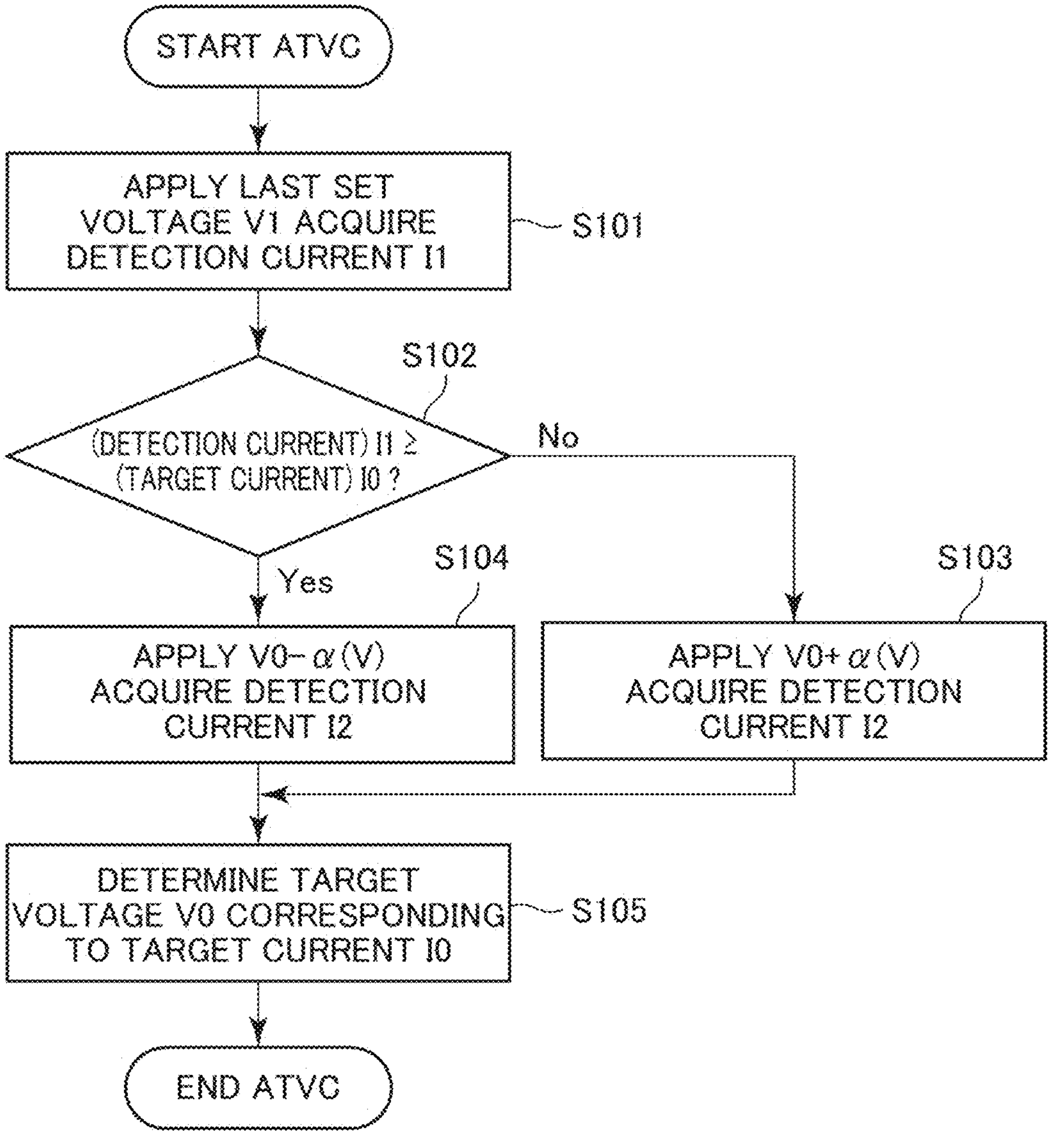

FIG. 7 is a flowchart of primary transfer ATVC.

Figure 8:
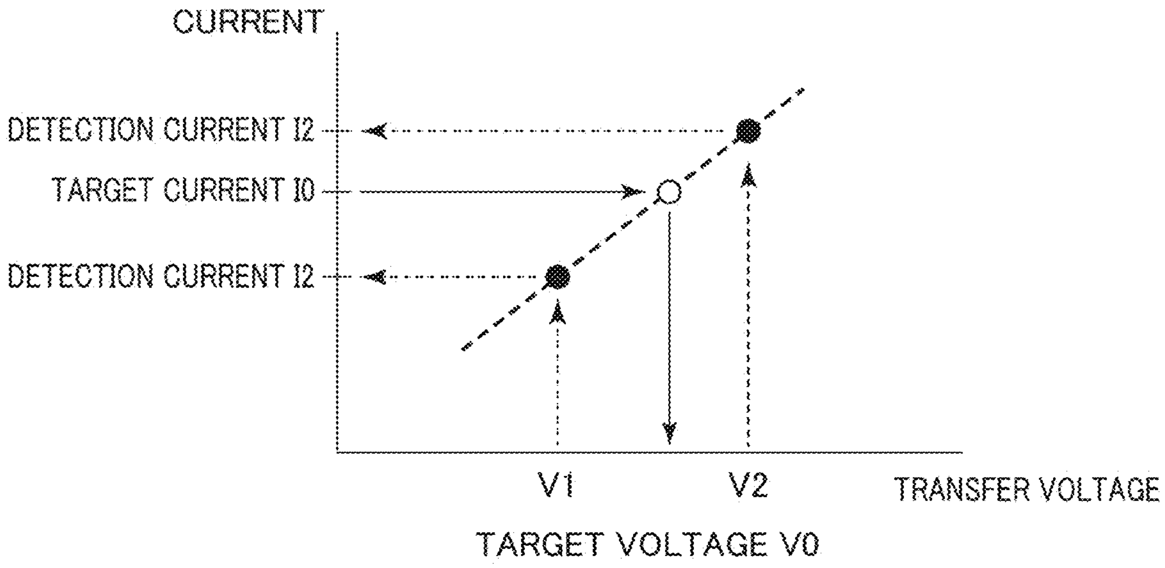

FIG. 8 is a schematic graph of a voltage-current characteristic acquired by the primary transfer ATVC.

Figure 9:
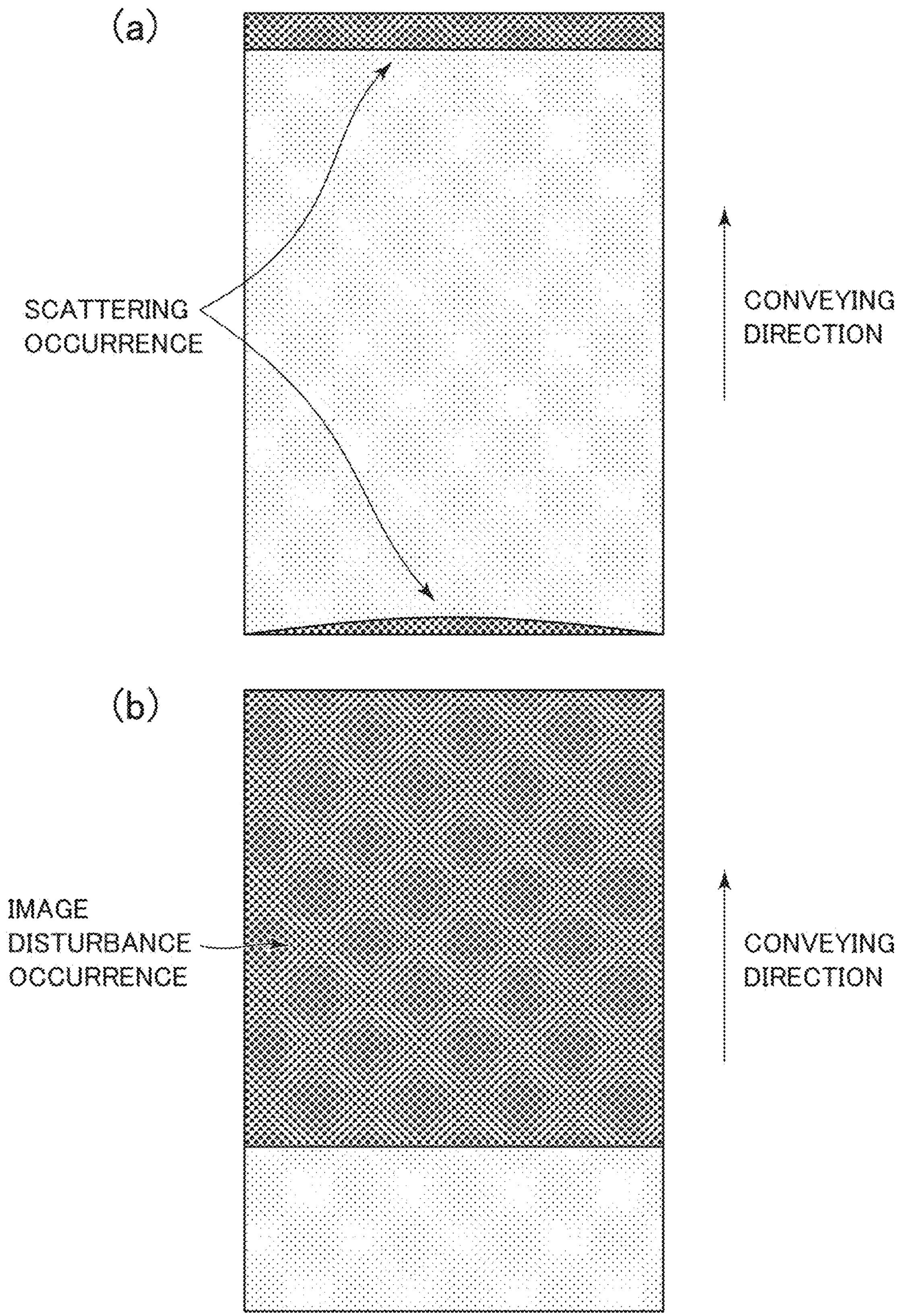

FIG. 9 is a schematic sectional view for illustrating scattering and image disturbance.

Figure 10:
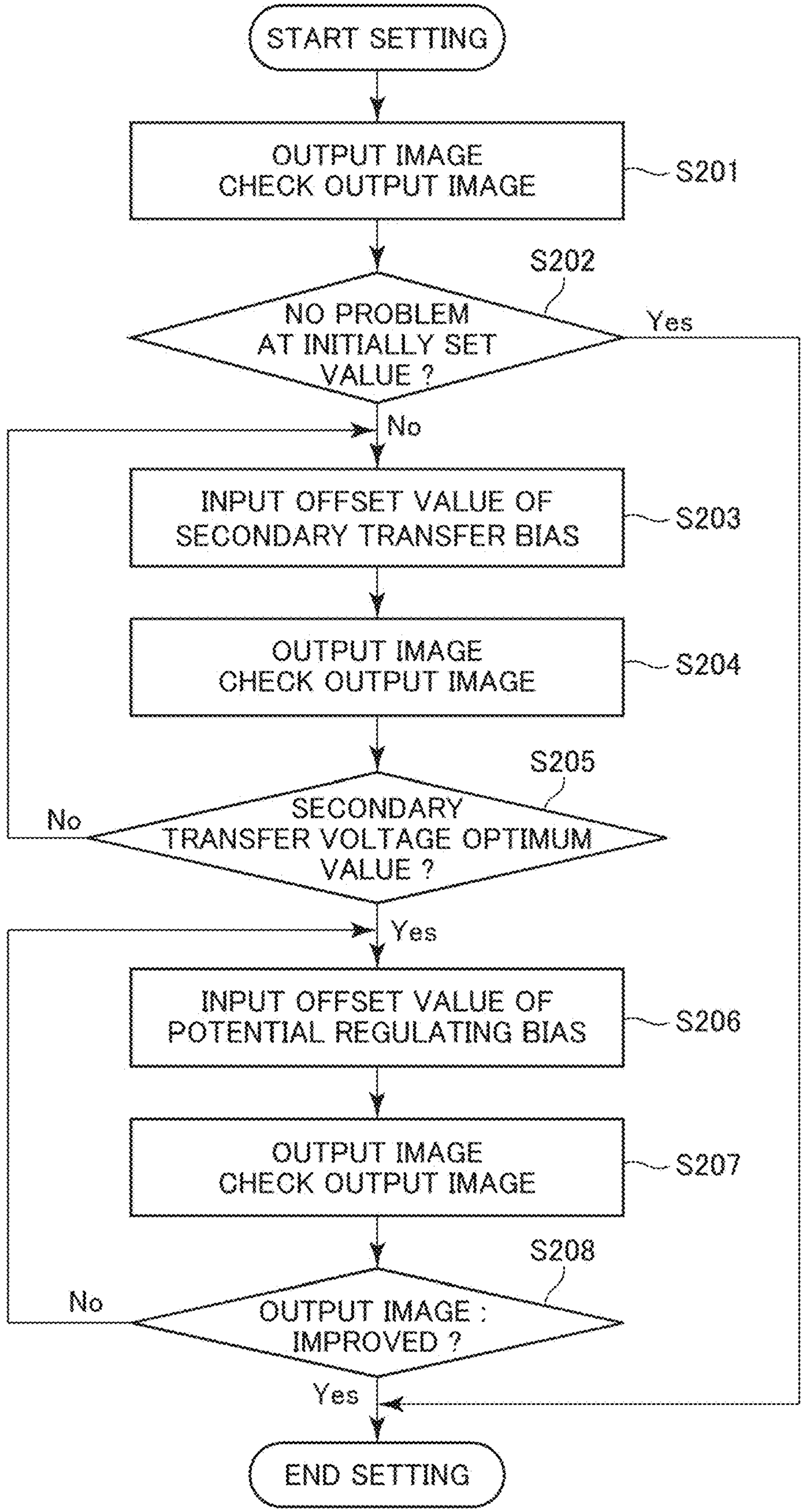

FIG. 10 is a flow chart showing an example of procedure for adjusting a potential regulating bias.

Figure 11:
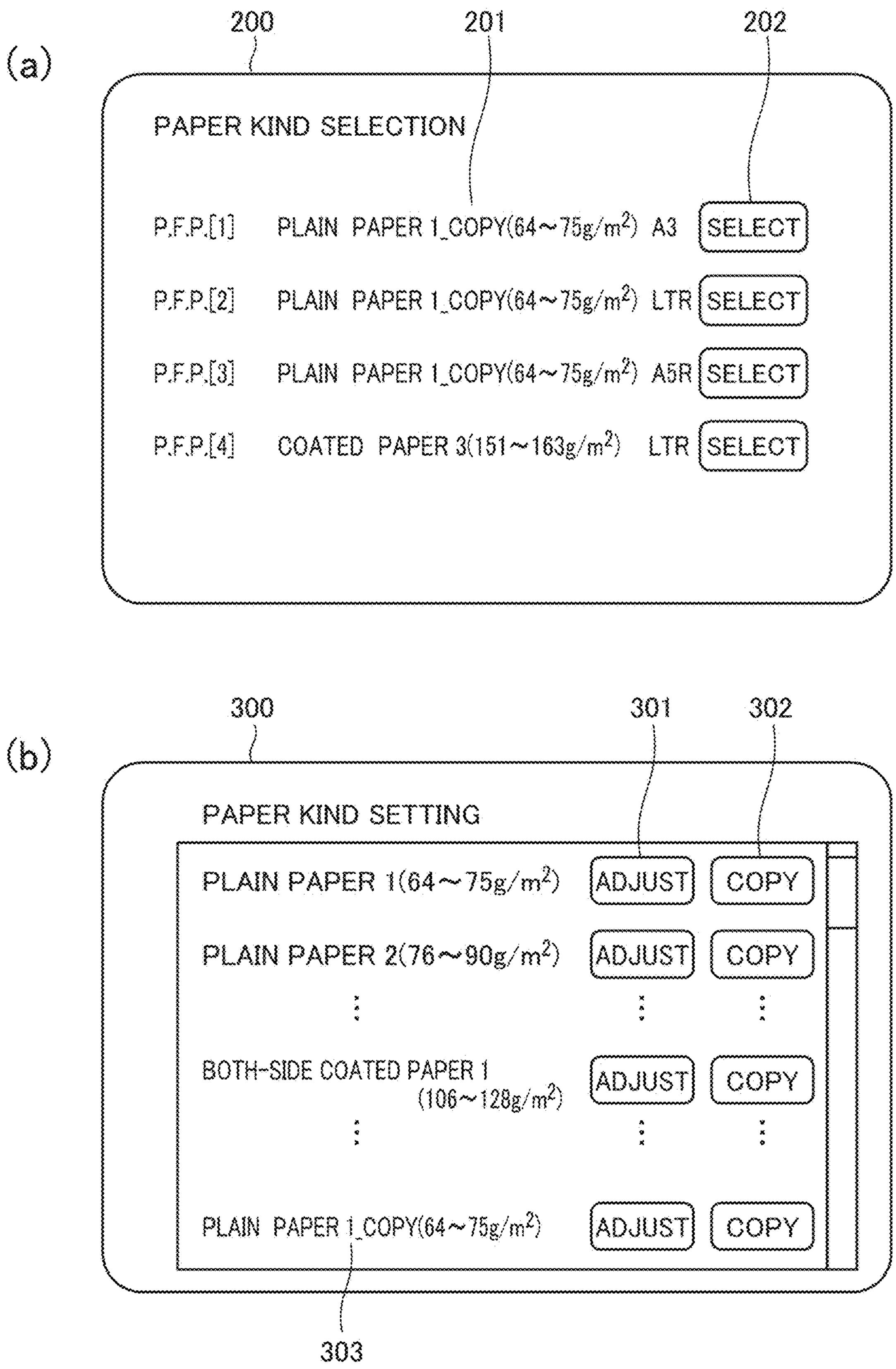

Parts (a) and (b) of FIG. 11 are schematic views for illustrating an arrangement of examples of a recording material selecting screen and a recording material setting screen, respectively.

Figure 12:
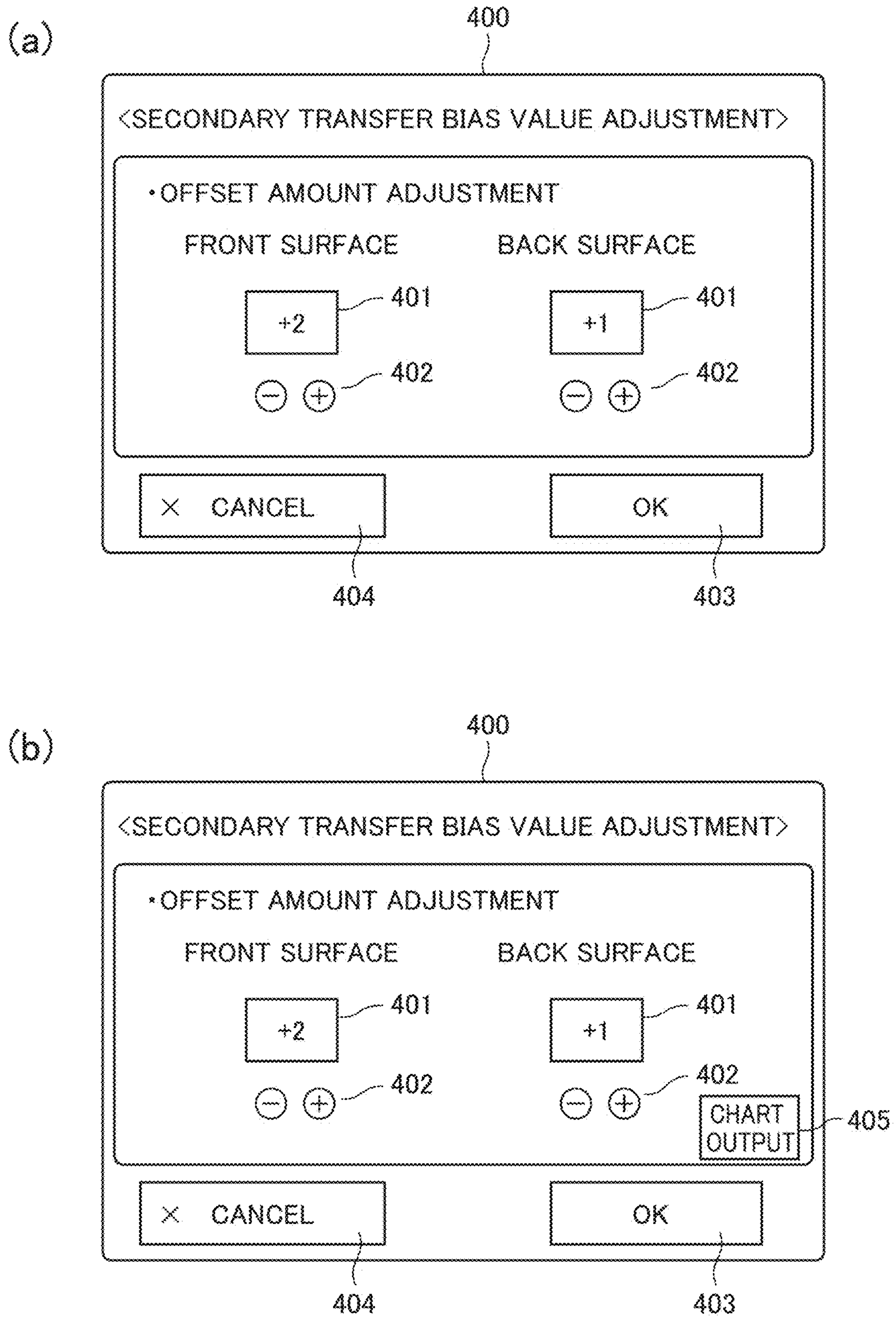

Parts (a) and (b) of FIG. 12 are schematic views of an example and another example, respectively, of a secondary transfer bias adjusting screen.

Figure 13:
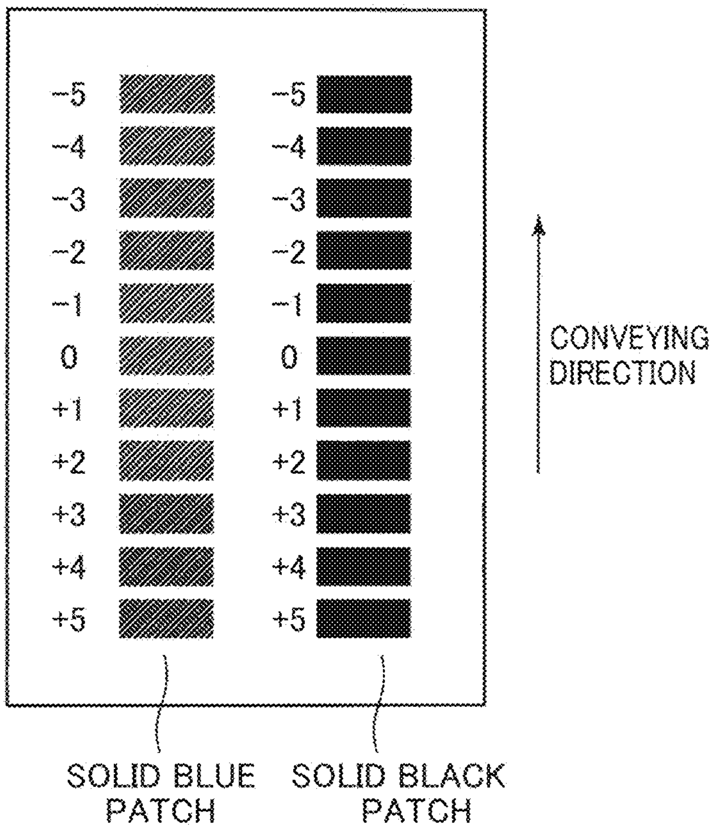

FIG. 13 is a schematic view of an example of a secondary transfer bias adjusting image.

Figure 14:
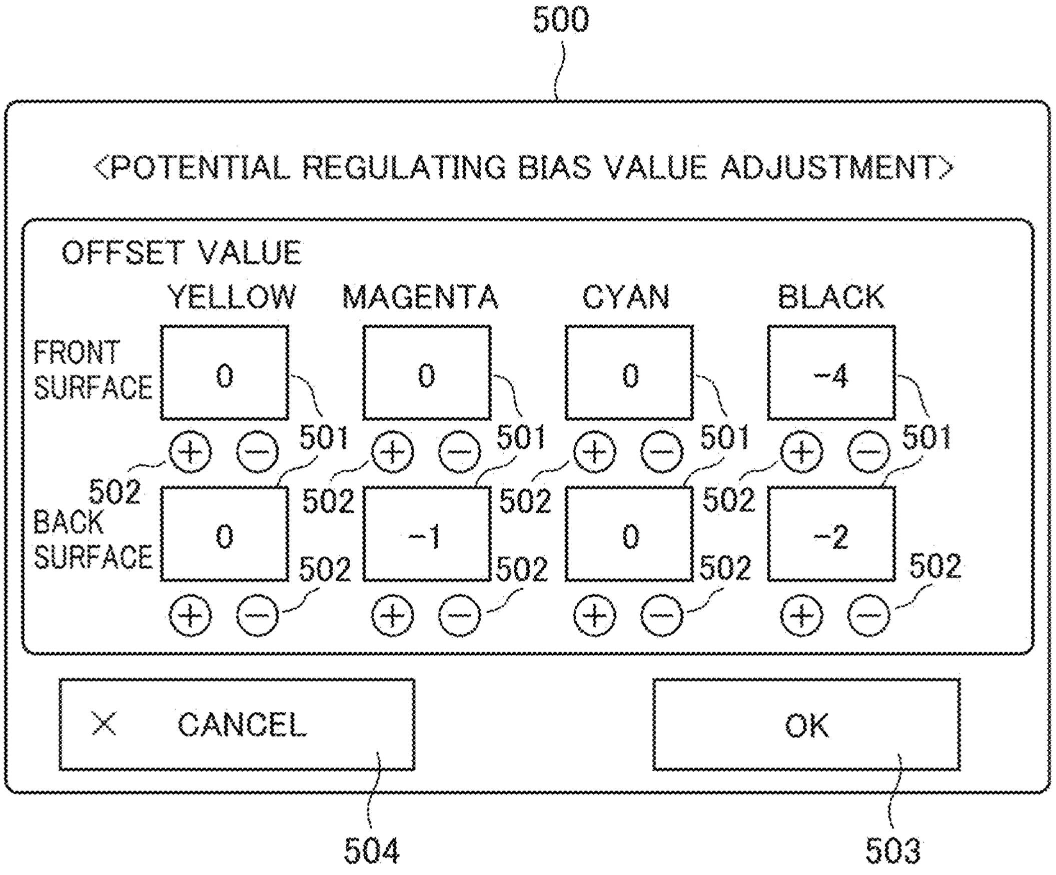

FIG. 14 is a schematic view of an example of a potential regulating bias adjusting screen.

Figure 15:
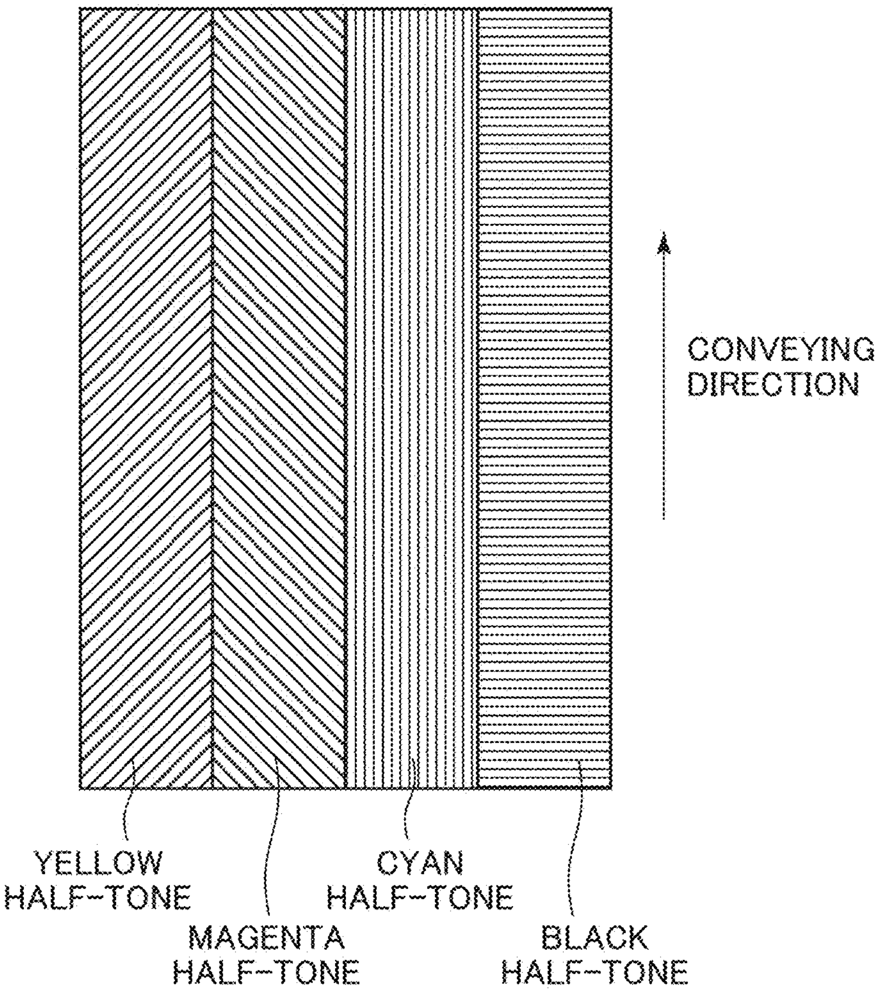

FIG. 15 is a schematic view of an example of a potential regulating bias adjusting screen.

Figure 16:
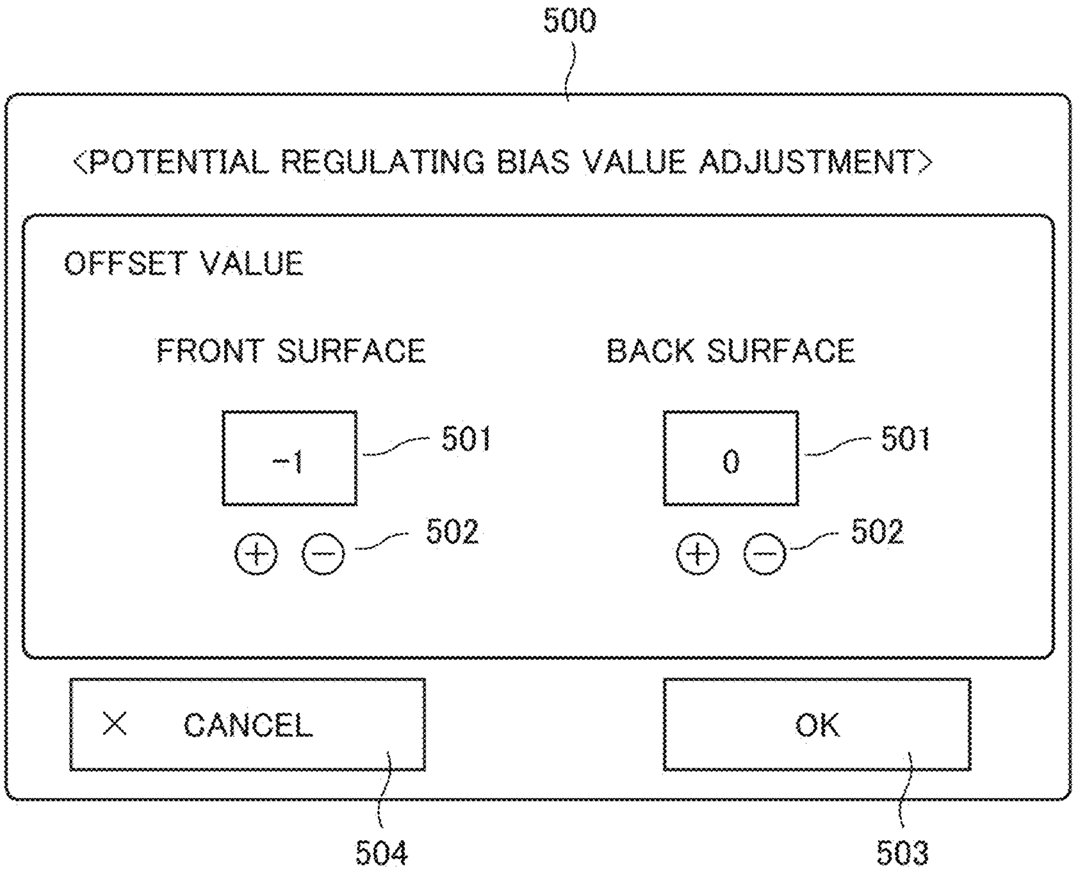

FIG. 16 is a schematic view of another example of the potential regulating bias adjusting screen.

Figure 17:
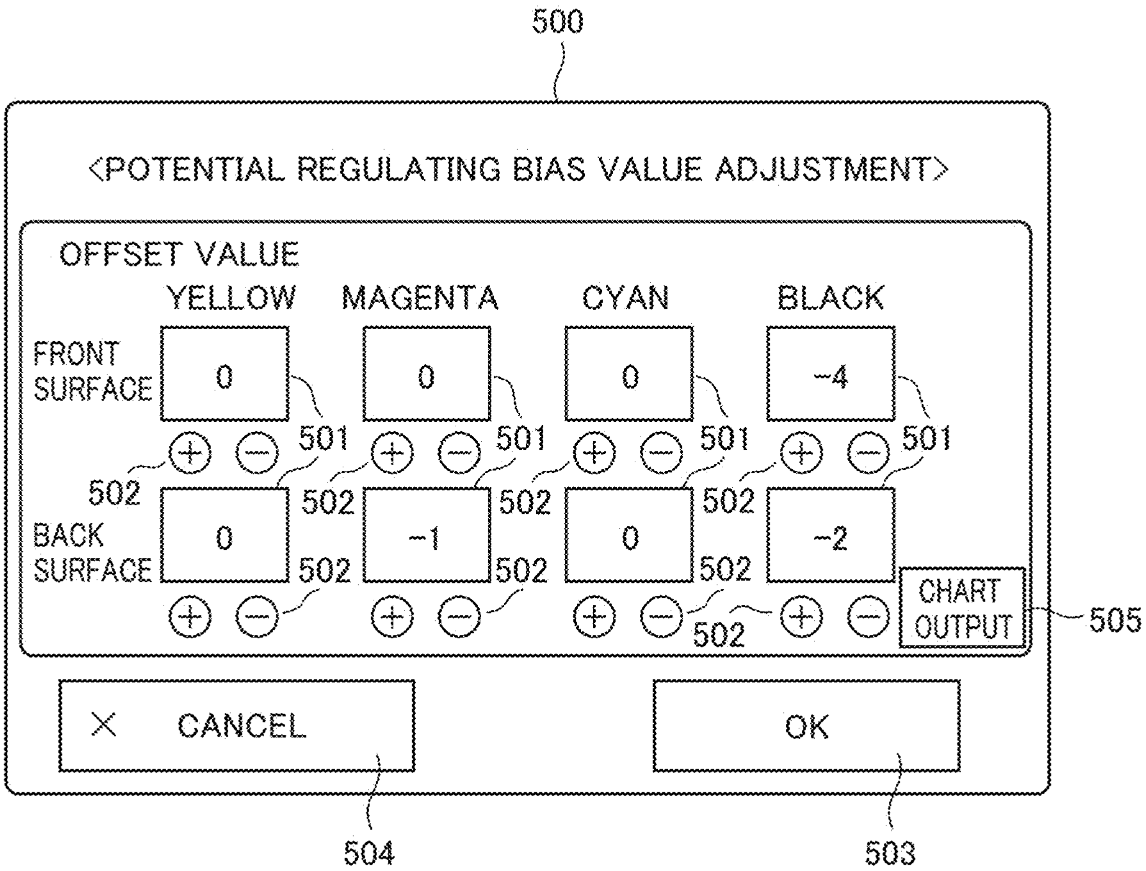

FIG. 17 is a schematic view of a further example of the potential regulating bias adjusting screen.

Figure 18:
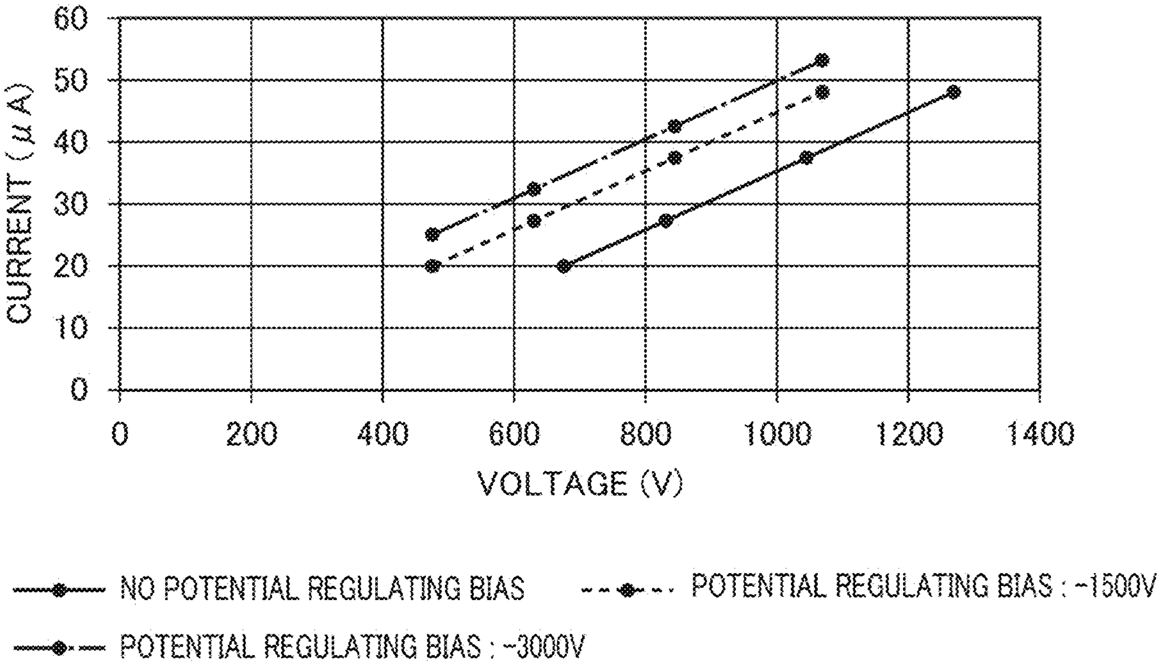

FIG. 18 is a graph for illustrating a change in relationship between an output voltage of a primary transfer power source by the potential regulating bias and a current through a primary transfer power source.

Figure 19:
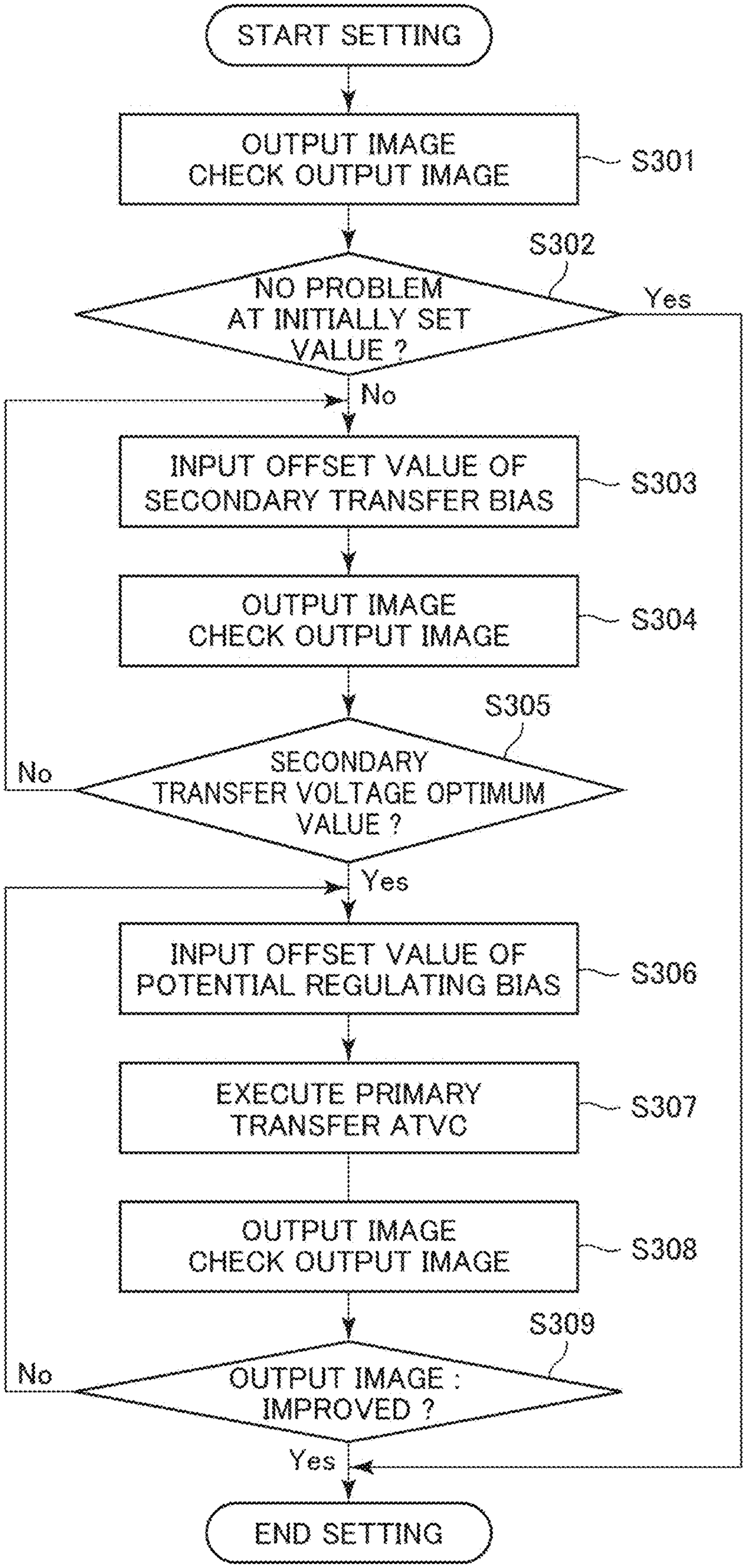

FIG. 19 is a flowchart of another example of procedure for adjusting the potential regulating bias.

Figure 20:
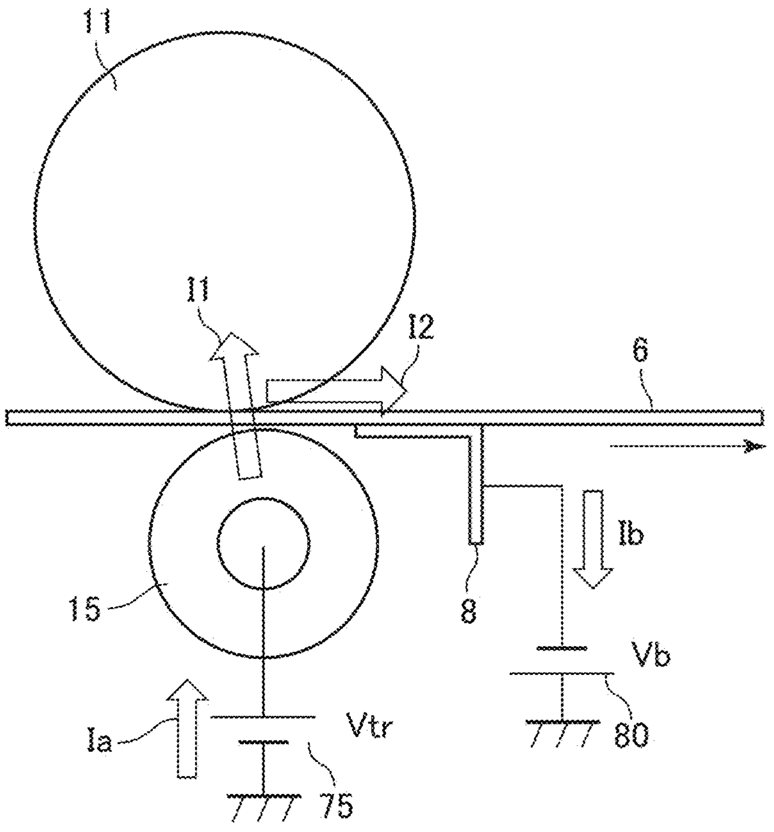

FIG. 20 is a schematic view for illustrating a current path around a primary transfer portion.

Figure 21:
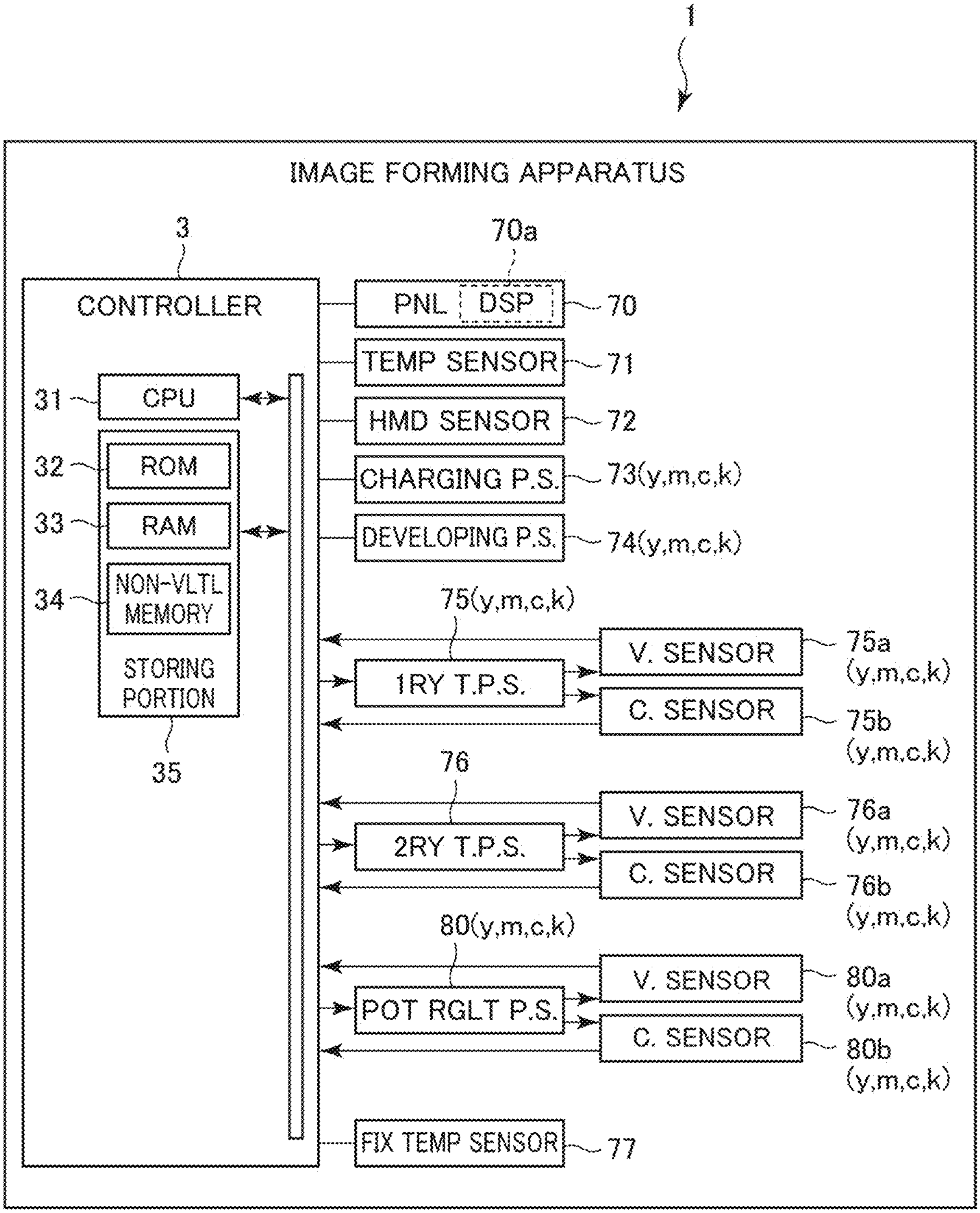

FIG. 21 is a schematic block diagram of another example of the control system of the image forming apparatus.

Figure 22:
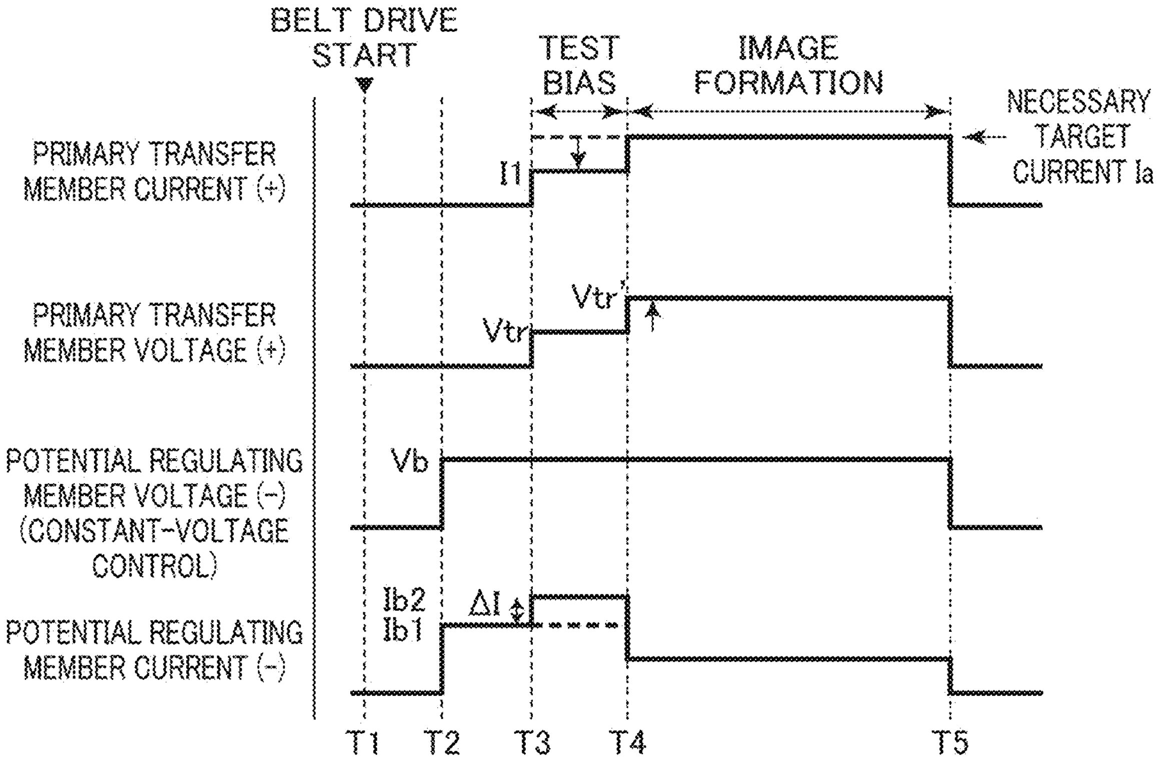

FIG. 22 is a timing chart for illustrating correction control of a primary transfer bias.

DESCRIPTION OF EMBODIMENTS

In the following, the image forming apparatus according to the present invention will be described in more detail with reference to the drawings.

EMBODIMENT 1

1. General Structure and Operation of Image Forming Apparatus

Figure 1:
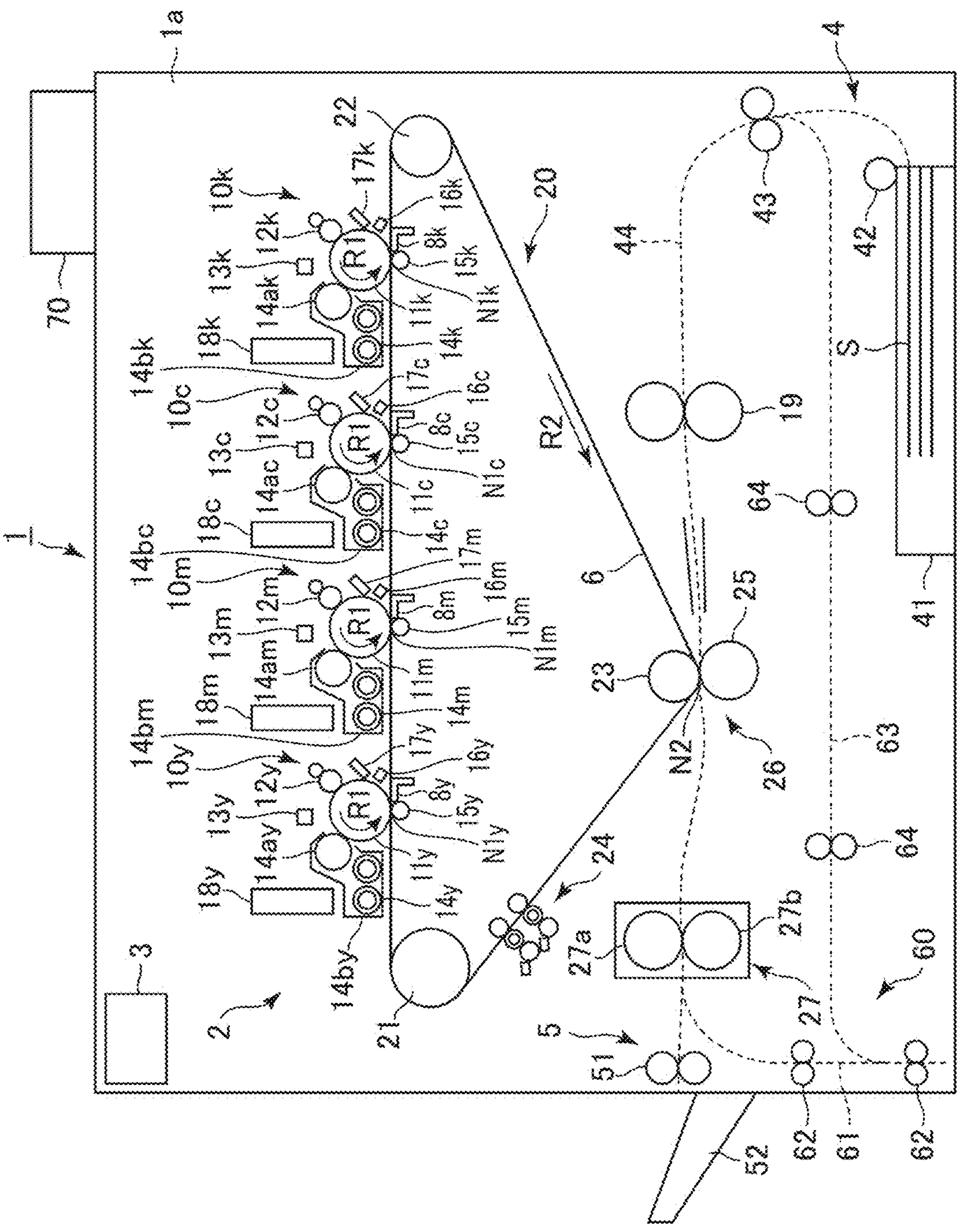
FIG. 1 is a schematic sectional view of an image forming apparatus.

First, a general structure and an operation of the image forming apparatus of this embodiment will be described. FIG. 1 is a schematic sectional view of an image forming apparatus 1 of this embodiment. The image forming apparatus 1 of this embodiment is a tandem type full-color printer capable of forming a full-color image on a sheet-like recording material S by using an electrophotographic type system and employing an intermediary transfer type method.

The image forming apparatus 1 includes image forming portion 2, a controller 3, a feeding portion 4 of the recording material S, and a discharging portion 5 of the recording material S. Further, inside the image forming apparatus 1, a temperature sensor 71 (FIG. 2) capable of detecting a temperature inside the apparatus and a humidity sensor 72 (FIG. 2) capable of detecting a humidity inside the apparatus are provided. The image forming apparatus 1 is capable of forming an image on the recording material S on the basis of image information (image signal) acquired by an original reading apparatus (not shown) provided on the image forming apparatus 1 or connected to the image forming apparatus 1. Further, the image forming apparatus 1 is capable of forming an image on the recording material S on the basis of image information (image signal) from an external device (not shown), such as a personal computer (host device), a digital camera, or a smartphone, connected to the image forming apparatus 1. Incidentally, the recording material (transfer material, recording medium, sheet) S is material on which the image is formed with toner, and specific examples thereof include plain paper, thick paper, gloss coated paper, mat coated paper, embossed paper, or synthetic resin sheets (synthetic paper) which are substitutes for plain paper or the like, and overhead projector sheets (resin film). Here, the recording material S is referred to as "paper" ("paper", "embossed paper", "high-resistance paper", or the like) in some instances, but even in that case, the recording material S includes a material other than the paper or a recording material formed with a material containing the material other than the paper.

The image forming portion 2 forms the image on the recording material S fed from the feeding portion 4 on the basis of the image information. The image forming portion 2 includes image forming units 10y, 10m, 10c, 10k, toner bottles 18y, 18m, 18c, 18k, exposure devices 13y, 13m, 13c, 13k, an intermediary transfer unit 20, a secondary transfer device 26, and a fixing device 27. The image forming units 10y, 10m, 10c and 10k form toner images of colors of yellow (Y), magenta (M), cyan (C), and black (K), respectively. Elements having the same or corresponding functions of structures provided for the respective colors will be collectively described by omitting suffixes y, m, c, and k for representing elements for associated colors, respectively, in some instances. Further, the image forming apparatus 1 can also form, for example, a single-color image such as a (single) black image or a multi-color image by using the image forming unit(s) 10 for a desired single color or some of the four colors.

The image forming unit 10 includes a photosensitive drum 11 which is a drum-type (cylindrical) photosensitive member (electrophotographic photosensitive member) as an image bearing member. In addition, the image forming unit 10 includes a charging roller 12 which is a roller-type charging member as charging means. In addition, the image forming unit 10 includes a developing device 14 as developing means. In addition, the image forming unit includes a pre-exposure device 16 as a discharging (charge eliminating) means. In addition, the image forming unit 10 includes a drum cleaning device 17 as a photosensitive member cleaning means. The image forming unit 10 forms a toner image on an intermediary transfer belt 6 described hereinafter.

The photosensitive drum 11 is movable (rotatable) while carrying an electrostatic image (electrostatic latent image) or a toner image. In this embodiment, the photosensitive drum 11 is a negatively chargeable organic photosensitive member (OPC) having an outer diameter of 30 mm. The photosensitive drum 11 has an aluminum cylinder as a substrate and a surface layer formed on the surface of the substrate. In this embodiment, as the surface layer, three layers of an undercoat layer, a photocharge generation layer, and a charge transportation layer, which are applied and laminated on the substrate in the order named are provided. When an image forming operation is started, the photosensitive drum 11 is rotationally driven in a direction indicated by an arrow R1 (counterclockwise) in the figure at a predetermined peripheral speed (process speed) by a driving motor (not shown) as a driving means.

The surface of the rotating photosensitive drum 11 is uniformly electrically charged by the charging roller 12. In this embodiment, the charging roller 12 is a rubber roller which contacts the surface of the photosensitive drum 11 and which is rotated by the rotation of the photosensitive drum 11. To the charging roller 12, a charging power source 73 (FIG. 2) as a charging bias applying means (charging bias applying portion) is connected. The charging power source 73 applies a predetermined charging bias (charging voltage) to the charging roller 12 during the charging process.

The surface of the charged photosensitive drum 11 is scanned and exposed by the exposure device 13 on the basis of the image information, so that an electrostatic image is formed on the photosensitive drum 11. The exposure device 13 is a laser scanner in this embodiment. The exposure device 13 emits laser light in accordance with separated color image information outputted from the controller 3, and scans and exposes the surface (outer peripheral surface) of the photosensitive drum 11.

The electrostatic image formed on the photosensitive drum 11 is developed (visualized) by supplying the toner thereto by the developing device 14, so that a toner image (developer image) is formed on the photosensitive drum 11. In this embodiment, the developing device 14 is a two-component developing device using, as a developer, a two-component developer comprising toner (non-magnetic toner particles) and a carrier (magnetic carrier particles). In a developing container (developing main body) 14b of the developing device 14, the two-component developer is accommodated, and toner in an amount corresponding to a consumed amount of the toner is supplied from the toner bottle 18. The developing device 14 includes a developing sleeve 14a as a developing member (developer carrying member). The developing sleeve 14a is made of, for example, a non-magnetic material such as aluminum or non-magnetic stainless steel (aluminum in this embodiment). Inside the developing sleeve 14a, a magnet roller (not shown) which is a roller-shaped magnet as a magnetic field-generating means (magnetic field-generating member) is fixed and arranged so as not to rotate relative to the developing container 14b. The developing sleeve 14a carries the two-component developer and conveys it to a developing region opposing the photosensitive drum 11. Then, in the developing region, the toner is moved to and deposited on an image portion of the electrostatic image on the photosensitive drum 1 from the two-component developer on the developing sleeve 14a. A developing power source 74 (FIG. 2) as a developing bias applying means (developing bias applying portion) is connected to the developing sleeve 14a. The developing power source 74 applies a predetermined developing bias (developing voltage) to the developing sleeve 14a during the development. In this embodiment, on an exposed portion (image portion) of the photosensitive drum 11 lowered in absolute value of the potential by being exposed after being uniformly charged, the toner charged to the same polarity (negative polarity in this embodiment) as the charge polarity of the photosensitive drum 11 is deposited (reverse development type). In this embodiment, the normal charge polarity of the toner, which is a principal charge polarity of the toner during the development, is the negative polarity.

An intermediary transfer unit 20 is arranged so as to oppose the four photosensitive drums 11y, 11m, 11c and 11k. The intermediary transfer unit 20 includes the intermediary transfer belt 6 which is constituted by an endless belt as an intermediary transfer member. The intermediary transfer belt 6 is wound around, and stretched by, as a plurality of stretching rollers, a driving roller 21, a tension roller 22, and an inner secondary transfer roller 23. The intermediary transfer belt 6 is movable (rotatable) while carrying the toner image. The driving roller 21 is rotationally driven by a driving motor (not shown) as driving means, so that a driving force is transmitted to the intermediary transfer belt 6, and thus the intermediary transfer belt 6 is rotated (circulated and moved) in an arrow R2 direction (clockwise direction) in FIG. 1 at a predetermined peripheral speed corresponding to the peripheral speed of the photosensitive drum 1. The tension roller 22 controls the tension of the intermediary transfer belt 6 to be constant. The tension roller 22 is subjected to a force which pushes the intermediary transfer belt 6 from an inner peripheral surface (back surface) side toward an outer peripheral surface (front surface) side by an urging force of a tension spring (not shown) constituted by a compression coil spring which is an urging member as an urging means. By this force, a tension of about 2 to 5 kg is applied in the conveying direction (process progression direction, movement direction) of the intermediary transfer belt 6. The inner secondary transfer roller 23 constitutes a secondary transfer device 26 in combination with an outer secondary transfer roller 25 described hereinafter. On the inner peripheral surface side of the intermediary transfer belt 6, the primary transfer rollers 15*y*, 15*m*, 15*c*, 15*k*, which are roller-type primary transfer members as primary transfer means, are provided correspondingly to the photosensitive drums 11*y*, 11*m*, 11*c*, 11*k*, respectively. In this embodiment, the primary transfer rollers 15 are disposed opposed to the photosensitive drums 11 and nip the intermediary transfer belt 6 between themselves and the photosensitive drums 11. Each of the primary transfer rollers 15 is pressed toward the photosensitive drum 11 and contacts the photosensitive drum 11 by way of the intermediary transfer belt 6, and forms a primary transfer portion (primary transfer nip) N1 which is a contact portion between the photosensitive drum 11 and the intermediary transfer belt 6. The stretching rollers other than the driving roller 21 and the primary transfer rollers 15 are rotated with the rotation of the intermediary transfer belt 6.

The toner image formed on the photosensitive drum 11 is transferred (primarily transferred) onto the intermediary transfer belt 6 in the primary transfer portion N1 by the action of the primary transfer roller 15. For example, when forming a full-color image, the yellow, magenta, cyan, and black toner images formed on the photosensitive drums 11 are multiple-transferred so as to be sequentially superimposed on the intermediary transfer belt 6. A primary transfer power source 75 (FIG. 2) as a primary transfer bias applying means (primary transfer bias applying portion) is connected to the primary transfer roller 15. During the primary transfer, the primary transfer power source 75 applies a primary transfer bias (primary transfer voltage) which is a DC voltage having a polarity opposite to the normal charge polarity of the toner (positive polarity in this embodiment) to the primary transfer roller 15. By this, the toner image of the negative polarity on the photosensitive drum 11 is primarily transferred onto the intermediary transfer belt 6. To the primary transfer power source 75, a voltage detecting sensor 75*a* (FIG. 2) as a voltage detecting means (voltage detecting portion) which detects an output voltage thereof and a current detecting sensor 75*b* (FIG. 2) as a current detecting means (current detecting portion) which detects an output current thereof are connected. In this embodiment, for example, a primary transfer bias of about 1 kV to 2 kV is applied to the primary transfer roller 15 ("1 kV to 2 kV" shows a range including 1 kV and 2 kV, and the same applies hereinafter). In addition, in this embodiment, the primary transfer bias is subjected to constant-voltage control. In this embodiment, the primary transfer power sources 75*y*, 75*m*, 75*c* and 75*k* are provided independently for the primary transfer rollers 15*y*, 15*m*, 15*c* and 15*k*, respectively. Further, in this embodiment, the primary transfer biases applied to the primary transfer rollers 15*y*, 15*m*, 15*c* and 15*k* can be individually controlled.

Here, in this embodiment, the primary transfer roller 15 has a core metal and an elastic layer of ion conductive foam rubber (NBR rubber) formed at a periphery of the core metal. An outer diameter of the primary transfer roller 15 is, for example, 15 to 20 mm. In addition, as the primary transfer roller 15, a roller having an electric resistance value of $1\times10^5$ to $1\times10^8\Omega$ (N/N (23° C., 50% RH) condition, 2 kV applied) can be preferably used.

Further, in this embodiment, the intermediary transfer belt 6 is an endless belt having a two-layer structure including a base layer, and a surface layer in the order named from the inner peripheral surface side toward the outer peripheral surface side. As the material constituting the base layer, a resin such as polyimide or polycarbonate, in which an appropriate amount of carbon black is contained as an antistatic agent can be suitably used. The thickness of the base layer is, for example, 0.05 to 0.15 mm. As a material constituting the surface layer, a resin such as chloroprene rubber (CR) to which electroconductivity is imparted by carbon black can be suitably used. The thickness of the surface layer is, for example, 0.200 to 0.300 mm. In this embodiment, the intermediary transfer belt 6 has a volume resistivity of $5\times10^8$ to $1\times10^{14}$ Ω·cm (23° C., 50% RH). Incidentally, in this embodiment, the two-layer structure was employed in the intermediary transfer belt 6, but a single-light structure of a material corresponding to the material of the above-described base layer may also be employed. Further, the surface layer may also be formed as a resin-coated layer, of about 0.002 to 0.01 mm in thickness, containing a resin material such as a fluorine-containing resin. Further, the intermediary transfer belt 6 may have a multi-layer structure of three or more layers.

On the outer peripheral surface side of the intermediary transfer belt 6, the outer secondary transfer roller 25 which is a roller-type secondary transfer member as a secondary transfer means is disposed. The outer secondary transfer roller 25 as the secondary transfer member constitutes the secondary transfer device 26 in cooperation with the inner secondary transfer roller 23 as an opposing member (opposing electrode). The outer secondary transfer roller 25 is pressed toward the inner secondary transfer roller 23, and contacts the inner secondary transfer roller 23 by way of the intermediary transfer belt 6 and forms a secondary transfer portion (secondary transfer nip) N2 which is a contact portion between the intermediary transfer belt 6 and the outer secondary transfer roller 25. The toner image formed on the intermediary transfer belt 6 is transferred (secondarily transferred) onto the recording material S, nipped and conveyed by the intermediary transfer belt 6 and the outer secondary transfer roller 25, by the action of the secondary transfer device 26 in the secondary transfer portion N2. To the outer secondary transfer roller 25, a secondary transfer power source 76 as a secondary transfer bias applying means (secondary transfer bias applying portion) (FIG. 2) is connected. During the secondary transfer, the secondary transfer power source 76 applies a secondary transfer bias (secondary transfer voltage) which is a DC voltage having a polarity (positive polarity in this embodiment) opposite to the normal charge polarity of the toner to the outer secondary transfer roller 25. By this, the toner image of the negative polarity on the intermediary transfer belt 6 is secondarily transferred onto the recording material S. To the secondary transfer power source 76, a voltage detecting sensor 76*a* (FIG. 2) as a voltage detecting means (voltage detecting portion) for detecting the output voltage thereof and a current detecting sensor 76*b* (FIG. 2) as a current detecting means (current detecting portion) for detecting the output current thereof are connected. Further, the core metal of the inner secondary transfer roller 23 is connected to the ground potential. In this embodiment, for example, a secondary transfer voltage of about 1 to 6.5 kV is applied to the secondary transfer roller 25, and a current of about 15 to 100 μA is caused to flow through the secondary transfer portion N2, so that the toner image on the intermediary transfer belt 6 is secondarily transferred onto the recording material S. In this embodiment, the secondary transfer bias is subjected to constant-voltage control. Incidentally, a constitution in which to the inner secondary transfer roller 23 as the secondary transfer member, the secondary transfer bias which is the DC voltage of the same polarity as the normal charge polarity of the toner is applied from the secondary transfer power source

76, so that the outer secondary transfer roller 25 as the opposing member is connected to the ground potential may also be employed. The outer secondary transfer roller 25 may be constituted so as to be rotated with rotation of the intermediary transfer belt 6 or may also be constituted so as to be rotationally driven by a driving means.

The recording material S is fed from the feeding portion 4 toward the secondary transfer portion N2 in parallel to the forming operation of the toner image onto the intermediary transfer belt 6. The recording material S is accommodated in a cassette 41 as a recording material accommodating portion of the feeding portion 4. The recording material S accommodated in the cassette 41 is separated and fed one by one from the cassette 41 by a feeding roller 42 or the like as a feeding member of the feeding portion 4. This recording material S is conveyed by a conveying roller 43 or the like as a conveying member of the feeding portion 4 to a registration roller pair 19 as a conveying member provided on a conveying passage (conveying path) 44 of the recording material S. Then, this recording material S is conveyed by the registration roller pair 19 to the secondary transfer portion N2 by being timed to the toner image on the intermediary transfer belt 6. Incidentally, in FIG. 1, only one cassette 41 is illustrated, but the image forming apparatus 1 may also include a plurality of cassettes 41. Further, the feeding portion 4 may be capable of feeding the recording material S also from a recording material accommodating portion (recording material mounting portion) other than the cassette 41 such as a manual feeding tray or the like.

Here, in this embodiment, the outer secondary transfer roller 25 includes a core metal and an elastic layer of ion conductive foam rubber (NBR rubber) formed around the core metal. The outer diameter of the outer secondary transfer roller 25 is, for example, 20 to 25 mm. In addition, as the outer secondary transfer roller 25, a roller having an electric resistance value of $1\times10^5$ to $1\times10^8\Omega$ (measured at N/N (23° C., 50% RH), 2 kV applied) can be preferably used.

Figure 2:
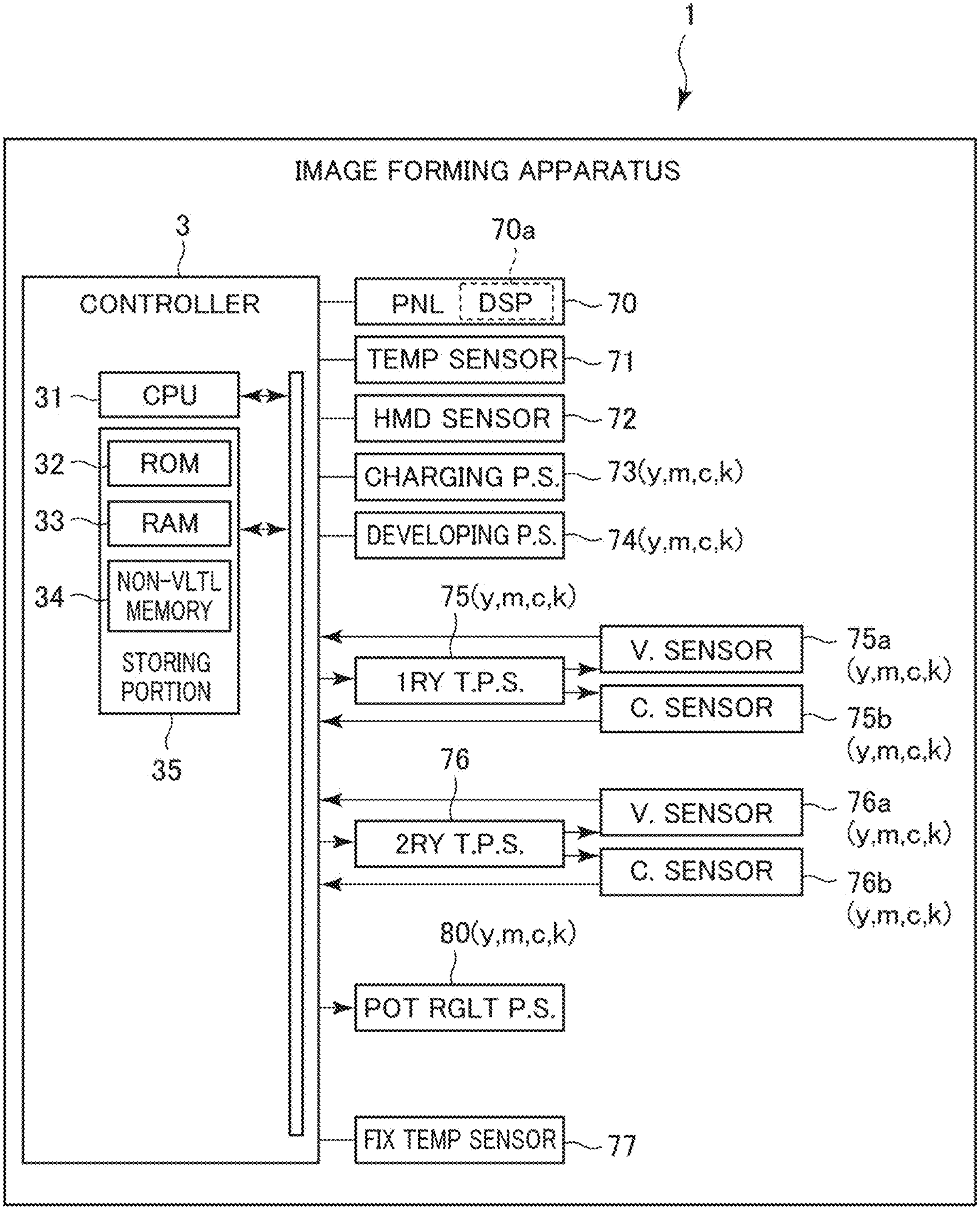
FIG. 2 is a schematic block diagram showing a control system of the image forming apparatus.

The recording material S onto which the toner image has been transferred is fed to a fixing device 27 as a fixing means. The fixing device 27 includes a fixing roller 27*a* and a pressing roller 27*b*. The fixing roller 27*a* includes therein a heater as a heating means. The pressing roller 27*b* is press-contacted to the fixing roller 27*a* and forms a fixing portion (fixing nip). The fixing device 27 causes the recording material S carrying the unfixed toner image to be heated and pressed by nipping and conveying the recording material S between the fixing roller 27*a* and the pressing roller 27*b*, and thus causes the toner image to be fixed (melted, sticked) on the recording material S. Incidentally, the temperature of the fixing roller 27*a* (fixing temperature) is detected by a fixing temperature sensor 77 (FIG. 2). The recording material S on which the toner image is fixed is conveyed in the discharging portion 5 by a discharging roller pair 51 or the like, and is discharged (outputted) through a discharge opening (not shown), onto a discharge tray 52 provided outside an apparatus main assembly 1*a* of the image forming apparatus 1.

Here, in the case of one-side printing in which the image is formed on one side (surface) of the recording material S, as described above, the recording material S on which the toner image is formed is discharged toward the discharge tray 52 through the discharging portion 5. Further, the image forming apparatus 1 of this embodiment includes a both (double)-side mechanism 60 enabling both (double)-side printing (automatic both-side printing) in which images are formed on both sides of the recording material S. In the case of the both-side printing, the recording material S on which the toner image is formed on a first side (surface) as described above is guided to a reverse conveying passage 61 by a reverse conveying roller pair 62 or the like. The recording material S conveyed to the reverse conveying passage 61 is reversed in conveying direction and is guided to a both-side conveying passage 63, and then is supplied again toward the secondary transfer portion N2 after being conveyed to the registration roller pair 19 by both-side conveying roller pairs 64 as a both-side conveying member. Then, the toner image is transferred onto a second side (surface) of the recording material S and is fixed on the recording material S, and then is discharged onto the discharge tray 52 through the discharging portion 5. The both-side mechanism 60 is constituted by the reverse conveying roller pairs 62, the reverse conveying passage 61, the both-side conveying passage 63, the both-side conveying roller pairs 64, and the like.

The surface of the photosensitive drum 11 after the primary transfer is electrically discharged by the pre-exposure device 16. In addition, toner remaining on the photosensitive drum 11 without being transferred onto the intermediary transfer belt 6 during the primary transfer (primary transfer residual toner) is removed from the surface of the photosensitive drum 11 by the drum cleaning device 17 and is collected. In this embodiment, the drum cleaning device 17 scrapes off the primary transfer residual toner from the surface of the rotating photosensitive drum 11 by a cleaning blade as a cleaning member, and collects the primary transfer residual toner in a collecting container (not shown). The cleaning blade is a plate-like member contacting the photosensitive drum 11 with a predetermined pressing force. The cleaning blade contacts the surface of the photosensitive drum 11 in a counter direction to the rotational direction of the photosensitive drum 11 so that a leading end thereof on a free end portion side faces the upstream side of the rotational direction of the photosensitive drum 11. Further, a deposited matter such as toner remaining on the intermediary transfer belt 6 without being transferred onto the recording material S during the secondary transfer (secondary transfer residual toner) or the like is removed and collected from the surface of the intermediary transfer belt 6 by a belt cleaning device 24 as an intermediary transfer member cleaning means.

Incidentally, the image forming unit 10 may constitute a cartridge (process cartridge) integrally detachably mountable to the apparatus main assembly 1*a*. In this embodiment, the intermediary transfer unit 20 is constituted by the intermediary transfer belt 6, the stretching rollers for the intermediary transfer belt 6, the respective primary transfer rollers 15, the belt cleaning device 24, and potential regulating members 8 and the like described hereinafter. The intermediary transfer unit 20 may be integrally detachably mountable to the apparatus main assembly 1*a*.

2. Control Constitution

FIG. 2 is a block diagram showing a schematic constitution of a control system of the image forming apparatus 1 of this embodiment. The image forming apparatus 1 is provided with the controller (control circuit) 3 as a control means. The controller 3 is constituted by including a CPU 31 as a calculating means, a storing portion 35 as a storing means, and an input/output circuit (I/F) (not shown) for inputting/outputting signals between itself and the external device. The storing portion 35 is constituted by including a ROM (including a rewritable one) 32, a RAM 33, a non-volatile memory 34, and the like. The ROM 32 stores programs or the like for controlling the respective portions of the image forming apparatus 1. The RAM 33 temporarily stores data on the control. The non-volatile memory 34 stores various pieces of setting information use history information, and the like. The CPU 31 is a microprocessor which controls the entire image forming apparatus 1 and is a main part of the system controller. The CPU 31 is connected to the respective portions such as the feeding portion 4, the image forming portion 2, the discharging portion 5, and the like, and not only exchanges signals with these portions, but also controls the operation of each of these portions. The ROM 32 stores an image formation control sequence for forming the image on the recording material S.

To the controller 3, the charging power source 73, the developing power source 74, the primary transfer power source 75, the secondary transfer power source 76, and a potential regulating power source 80 described hereinafter, which are controlled by signals from the controller 3, respectively, are connected. Incidentally, although omitted from illustration, in this embodiment, each of the charging power source 73, the developing power source 74, the primary transfer power source 75, and the potential regulating power source 80 is provided independently from the associated image forming unit 10. In addition, to the controller 3, the temperature sensor 71, the humidity sensor 72, the voltage detecting sensor 75*a* and the current detecting sensor 75*b* of the primary transfer power source 75, the voltage detecting sensor 76*a* and the current detecting sensor 76*b* of the secondary transfer power source 76, and the fixing temperature sensor 77, and the like are connected. A signal (information) indicating a detection result of the associated sensor is inputted to the controller 3.

Further, to the controller 3, an operating portion 70 is connected. The operating portion 70 includes an inputting portion constituted by an operation button (key) or the like as an input means, and a display portion 70*a* constituted by a liquid crystal panel (display) or the like as display means. Incidentally, in this embodiment, the display portion 70*a* is constituted as a touch panel, and also has a function as the input means. The operating portion 70 (display portion 70*a*) is capable of displaying various setting screens and the like by control of the controller 3. Further, an operator such as a user or a service person operates the operating portion 70 and thus is capable of performing input of various settings, input of a start instruction of a job (described later), and the like to the controller 3. The controller 3 receives the signal from the operating portion 70, is capable of carrying out registration of various settings to the storing portion 35 and control of operations of various devices of the image forming apparatus 1. Incidentally, the image forming apparatus 1 can also execute the job and register the various settings depending on the signal, for example, from the external device such as the personal computer, not from the operating portion 70.

Here, the image forming apparatus 1 executes a job (printing job, image forming operation), which is a series of operations, for forming and outputting image(s) on a single recording material S or a plurality of recording materials, which are stored, by a single start instruction. The job includes, in general, an image forming step, a pre-rotation step, a sheet (paper) interval step in the case where images are formed on the plurality of recording materials S, and a post-rotation step. The image forming step is a period in which formation of the electrostatic image for the image actually formed on the recording material S and then outputted, toner image formation, primary transfer of the toner image, and secondary transfer of the toner image are performed, and during image formation (image forming period) refers to this period. Specifically, at positions where steps of the formation of the electrostatic image, the toner image formation, the primary transfer of the toner image, and the secondary transfer of the toner image are formed, timings during the image formation are different from each other. The pre-rotation step is a period, from input of the start instruction until the image is actually started to be formed, in which a preparatory operation before the image forming step is performed. The paper interval step (recording material interval step, image interval step) is a period corresponding to an interval between a recording material S and a subsequent recording material S when images are successively formed on the plurality of recording materials S (continuous printing, continuous image formation). The post-rotation step is a period in which a post operation (preparatory operation) after the image forming step is performed. During non-image formation (non-image formation period) is a period other than during the image formation and includes the pre-rotation step, the paper interval step, and the post-rotation step, which are described above, and in addition, includes a pre-multi-rotation step which is a preparatory operation during power (switch)-on of the image forming apparatus 1 or during restoration from a sleep state.

The kind of the recording material S embraces distinction of the recording materials S classified by information on an arbitrary recording material S such as attributes (so-called paper kind category) based on general features (basis weight, thickness, surface property, light reflection/light transmission property, and the like) such as plain paper, high-quality paper, glass paper (glossy paper), coated paper, embossed paper, thick paper, thin paper, roughened paper, and the like; numerical values and numerical value ranges such as a basis weight, a thickness, rigidity, and the like; brands (including manufacturer, trade name, product number, and the like); or combinations of these factors; or the like. That is, for each of the recording materials S distinguished by the information on the recording material S, it can be regarded as that the kind of the recording material S is constituted. For the image forming apparatus 1, for example, for every kind of the recording material S classified by the paper kind category and the basis weight, an image forming condition (transfer condition, fixing condition, process speed, and the like) corresponding to the associated kind is set.

3. Problem of Secondary Transfer Property

Next, the problem in secondary transfer property will be further described. Incidentally, for convenience, unless otherwise mentioned, a magnitude (high/low) of a voltage and a potential refers to a magnitude (high/low) in the case where values thereof are compared with each other in terms of an absolute value. Further, as regards arrangements of the primary transfer portion N1, the photosensitive drum 11, the primary transfer roller 15, and the potential regulating member 8 described hereinafter, and the like, unless otherwise mentioned, upstream and downstream refer to upstream and downstream with respect to the conveying direction (process progression direction, movement direction) of the intermediary transfer belt 6.

As described above, the toner on the intermediary transfer belt 6 has a tendency that the charge amount thereof is increased by being subjected to the electric discharge between the intermediary transfer belt 6 and the photosensitive drum 11 on the side downstream of the primary transfer portion N1. When the present inventor proceeded with study, it turned out that a mirror force between the toner and intermediary transfer belt 6 increased by the increase in charge amount of the toner on the intermediary transfer belt 6 and thus it became difficult to transfer the toner onto the recording material S in the secondary transfer portion N2. For example, as described above, it becomes difficult to uniformly transfer the toner on the embossed paper with surface unevenness, or the like. Incidentally, the embossed paper is paper (fancy paper) provided with an uneven pattern by using a method such as embossing or stamping on the surface of the paper. Further, for example, due to generation of a difference in charge amount of the toner on the intermediary transfer belt 6 between the secondary color and the single color, it becomes difficult to set the secondary transfer bias suitable for the secondary transfer (a secondary transfer latitude becomes narrow).

In order to suppress the increase in charge amount of the toner on the side downstream of the primary transfer portion N1 as described above, suppression of the electric discharge on the side downstream of the primary transfer portion N1 is effective. Further, when the present inventor proceeds with study, it turned out that in order to suppress the electric discharge on the side downstream of the primary transfer portion N1, it is effective that the potential regulating member which is an electroconductive electrode member is provided downstream of the primary transfer portion N1 and on the inner peripheral surface side and a bias of the same polarity as the charge polarity of the photosensitive drum 11 is applied to the potential regulating member.

4. Potential Regulating Member

Next, a constitution of the potential regulating member 8 in this embodiment will be described. As shown in FIG. 1, in the image forming apparatus 1 of this embodiment, on sides downstream of the primary transfer portions N1*y*, N1*m*, N1*c*, and N1*k*, potential regulating members 8*y*, 8*m*, 8*c*, and 8*k* which are electrode members are provided, respectively, in contact with the inner peripheral surface of the intermediary transfer belt 6. In this embodiment, the potential regulating members 8*y*, 8*m*, 8*c*, and 8*k* provided in the primary transfer portions N1*y*, N1*m*, N1*c*, and N1*k*, respectively, have the substantially same constitution.

A shape of the potential regulating member 8 in this embodiment will be described. Part (a) of FIG. 3 is a sectional view (cross section substantially perpendicular to a rotational axis direction of the photosensitive drum 11) of the potential regulating member 8 in this embodiment. Further, part (b) of FIG. 3 is a perspective view of the potential regulating member 8 in this embodiment.

In this embodiment, the potential regulating member 8 includes a planar first portion 81 provided along a widthwise direction (direction substantially perpendicular to the conveying direction, direction substantially parallel to the rotational axis direction of the photosensitive drum 11) of the intermediary transfer belt 6. Further, in this embodiment, the potential regulating member 8 includes a planar second portion 82 provided along the widthwise direction of the intermediary transfer belt 6 and extending in a direction substantially perpendicular to a flat surface of the first portion 81. In this embodiment, a contact surface 83 of the first portion 81 of the potential regulating member 8, which is a contact portion contacting the inner peripheral surface of the intermediary transfer belt 6 is a flat surface. That is, in this embodiment, the first portion 81 constituting the contact surface 83 of the potential regulating member 8 is a flat plate.

Here, in a cross section substantially perpendicular to the rotational axis direction of the photosensitive drum 11, an upstream side end portion of the contact surface 83 is defined as "A" (or "upstream end A"), and a downstream side end portion of the contact surface 83 is defined as "B" (or "downstream end B"). In this embodiment, the upstream end A of the contact surface 83 corresponds to an upstream side end portion of the potential regulating member 8, and the downstream end B of the contact surface 83 corresponds to a downstream side end portion of the potential regulating member 8. By the action of the electric field formed in a space between the photosensitive drum 11 and the potential regulating member 8, in order to more effectively suppress the electric discharge between the intermediary transfer belt 6 and the photosensitive drum 11, the potential regulating member 8 may preferably be surface contacted to the intermediary transfer belt 6. From this viewpoint, a length of a line segment AB (between A and B), i.e., a "contact width" which is a length of the contact surface 83 in the conveying direction of the intermediary transfer belt 6 may preferably be 5 mm or more. With a longer length of the line segment AB, the above-described effect of suppressing the electric field becomes larger, but it would be considered that when the length becomes excessively long, stable contact of the potential regulating member 8 with the intermediary transfer belt 6 becomes difficult by the influence of part (component) accuracy or the like. The length of the line segment AB is insufficient in many cases when the length is 50 mm or less, and typically is 30 mm or less.

That is, the length of the line segment AB may suitably be about 5 to 50 mm, typically about 5 to 30 mm. From another viewpoint, it can be said that the length of the line segment AB is enough to be not more than a half of a center distance between adjacent photosensitive drums 11 in a cross section substantially perpendicular to the rotational axis direction of the photosensitive drum 11 in many cases. In this embodiment, the potential regulating member 8 which is 25 mm in length of the line segment AB is used. Incidentally, in this embodiment, the center distance between the photosensitive drums 11 in the cross section substantially perpendicular to the rotational axis direction of the photosensitive drum 11 is about 100 mm.

To the potential regulating member 8, the potential regulating power source 80 as a potential regulating bias applying means (potential regulating bias applying portion) is connected. In this embodiment, to the second portion 82 of the potential regulating member 8, the potential regulating power source 80 is connected. At least at the time of the primary transfer during the image forming operation, to the potential regulating member 8, a potential regulating bias (potential regulating voltage) which is a DC voltage of the same polarity as the charge polarity of the photosensitive drum 11 is applied by the potential regulating power source 80. The time of the primary transfer is specifically a period in which the primary transfer bias is applied, more specifically, a period in which an image region (region onto which the toner image is capable of being transferred) on the intermediary transfer belt 6 passes through the primary transfer portion N1. By this, it is possible to suppress the electric discharge between the intermediary transfer belt 6 and the photosensitive drum 11 on a side downstream of the primary transfer portion N1. In this embodiment, the potential regulating bias is a DC voltage of a negative polarity. In this embodiment, the potential regulating bias is subjected to constant-voltage control. Further, in the constitution of this embodiment, the potential regulating bias (constant voltage of the positive polarity) may preferably be about −500 to −3000 V.

The potential regulating member 8 is a member long in the widthwise direction of the intermediary transfer belt 6.

A length of the contact surface 83 of the potential regulating member 8 in a longitudinal direction (direction along the widthwise direction of the intermediary transfer belt 6) may preferably be longer than a maximum image width in the widthwise direction of the intermediary transfer belt 6. Incidentally, the maximum image width is a length of an image region of a maximum image capable of being formed by the image forming apparatus 1 with respect to the widthwise direction of the intermediary transfer belt 6. In this embodiment, the length of the contact surface 83 of the potential regulating member 8 in the longitudinal direction is longer than the above-described maximum image width and a width in which the primary transfer roller 15 contacts the intermediary transfer belt 6 with respect to the widthwise direction of the intermediary transfer belt 6. That is, in this embodiment, each of a range of the maximum image width and a range in which the primary transfer roller 15 contacts the intermediary transfer belt 6 with respect to the widthwise direction of the intermediary transfer belt 6 falls inside a range of the length of the contact surface 83 of the potential regulating member 8 in the longitudinal direction.

By this, irrespective of a length of the toner image, transferred onto the intermediary transfer belt 6, with respect to the widthwise direction of the intermediary transfer belt 6, it is possible to obtain an effect of suppressing an increase in charge amount of the toner on the intermediary transfer belt 6 by suppressing the above-described electric discharge. On the other hand, in this embodiment, the length of the potential regulating member 8 in the longitudinal direction is shorter than the width of the intermediary transfer belt 6. That is, in this embodiment, the range of the length of the potential regulating member 8 in the longitudinal direction falls inside the range of the width of the intermediary transfer belt 6. By this, in the case where an end portion of the potential regulating member 8 with respect to the longitudinal direction protrudes further than an end portion of the intermediary transfer belt 6 with respect to the widthwise direction does, electric discharge to the potential regulating member 8 and a member around the intermediary transfer belt 8, and the like occurs, so that a possibility that the effect of suppressing the electrical discharge becomes small can be reduced.

The potential regulating member 8 can be constituted only by, for example, a single material having electroconductivity. In this embodiment, the potential regulating member 8 is constituted substantially only of metal having electroconductivity, such as SUS (stainless steel). Specifically, in this embodiment, the potential regulating member 8 is constituted by forming the first portion 81 and the second portion 82 by subjecting a plate material made of metal (metal plate) such as SUS to bending. In this embodiment, each of the first portion 81 and the second portion 82 of the potential regulating member 8 is not substantially deformed in a use state of the image forming apparatus 1. By thus subjecting the metal plate to the bending, strength of the potential regulating member 8 can be increased. However, the present invention is not limited to such an embodiment, but the potential regulating member 8 may also be constituted by two or more materials.

FIG. 4 is a sectional view (cross section substantially perpendicular to the rotational axis direction of the photosensitive drum 11) in another example of the potential regulating member 8. For example, as shown in FIG. 4, a constitution in which a base portion 84 having a shape similar to the shape of the potential regulating member 8 shown in FIG. 3 and a surface layer 85 formed on the base portion 84 are provided can be employed. The contact surface 83 contacting the intermediary transfer belt 6 and the surface layer 85 constituting a connecting portion with the potential regulating power source 80 are formed of an electroconductive material such as metal or an electroconductive resin material. The base portion 84 may be formed of the electroconductive material, but may also be formed of a non-electroconductive material such as a non-electroconductive resin material. The base portion 84 and the surface layer 85 can be fixed by an arbitrary fixing means such as an adhesive or welding.

Further, FIG. 5 is a sectional view (cross-section substantially perpendicular to the rotational axis direction of the photosensitive drum 11) in still another example of the potential regulating member 8. For example, as shown in FIG. 5, the contact surface 83 of the potential regulating member 8 contacting the intermediary transfer belt 6 may also be formed of an electroconductive nonwoven fabric 86. Incidentally, in FIG. 5, the electroconductive nonwoven fabric 86 is provided on the contact surface 83 of the potential regulating member 8 having the constitution shown in FIG. 4, but may also be provided on the contact surface 83 of the potential regulating member 8 having the constitution shown in FIG. 3. The electroconductive nonwoven fabric 86 can be fixed by an arbitrary fixing means such as an electroconductive adhesive. Further, instead of the nonwoven fabric 86, a felt, a pile fabric cut pile fabric (velvet, brush) or loop pile fabric (toweling)) which are constituted using electroconductive fibers, or a sponge (elastic foam member) constituted using an electroconductive rubber material or the like may also be used. Thus, the contact surface 83 of the potential regulating member 8 contacting the intermediary transfer belt 6 is constituted by a flexible material or an elastic material, so that it is possible to reduce a possibility of an occurrence of scars on an inner peripheral surface of the intermediary transfer belt 6 caused by friction (slide) between the inner peripheral surface of the intermediary transfer belt 6 and the potential regulating member 8.

Next, an arrangement of the potential regulating member 8 in this embodiment will be described. FIG. 6 is a sectional view (cross section substantially perpendicular to the rotational axis direction of the photosensitive drum 11) for illustrating the arrangement of the potential regulating member 8 provided between two primary transfer portions N1 adjacent to each other in the conveying direction of the intermediary transfer belt 6. In FIG. 6, as an example, a potential regulating member 8*c* provided between the primary transfer portions N1*c* for cyan and N1*k* for black is shown.

In this embodiment, an outer diameter of the photosensitive drum 11 is 30 mm, an outer diameter of the primary transfer roller 15 is 18 mm, and a thickness of the intermediary transfer belt 6 is 0.350 mm. Further, in this embodiment, the primary transfer roller 15 is offset toward a downstream side relative to the photosensitive drum 11. In this embodiment, an offset amount X1 is 3 mm. Incidentally, the offset amount X1 is a distance between a rotation center of the photosensitive drum 11 and a rotation center of an associated primary transfer roller 15 in a direction along a common tangential line on a side where a plurality of photosensitive drums 11 contact the intermediary transfer belt 6 in a cross-section substantially perpendicular to the rotational axis direction of the photosensitive drum 11.

Here, in order to illustrate the arrangement of the potential regulating member 8, the case where the potential regulating member 8 is removed is assumed. In the cross section substantially perpendicular to the rotational axis direction of the photosensitive drum 11, a rectilinear line along which a stretching surface of the intermediary transfer belt on an inner peripheral surface side in a portion downstream of the primary transfer portion N1 passes in the case where there is no potential regulating member 8 is defined as a rectilinear line L. Incidentally, specifically, this rectilinear line L corresponds to the stretching surface in a state in which only the potential regulating member 8 is substantially removed from the constitution of the image forming apparatus 1 in a state during the image forming operation. Further, on the rectilinear line L, a portion where the inner peripheral surface of the intermediary transfer belt 6 is separated from a closest stretching member on an upstream side of the potential regulating member 8 is defined as "C (or upstream stretching portion C)", and a portion where the inner peripheral surface of the intermediary transfer belt 6 is separated from a closest stretching member on a downstream side of the potential regulating member 8 is defined as "D (or downstream stretching portion D)". Incidentally, in FIG. 6, the rectilinear line L is schematically shown substantially horizontally, but in the case where the surface of the primary transfer roller 15 is raised toward the photosensitive drum 11 side by deformation or the like of the elastic layer of the primary transfer roller 15, the rectilinear line L may be inclined downward toward the downstream side in the figure.

In this embodiment, the closest stretching member on the upstream side of the potential regulating member 8 is the primary transfer roller 15, and a position on the inner peripheral surface of the intermediary transfer belt 6 at a portion where the intermediary transfer belt 6 is separated from the primary transfer roller 15 is the upstream stretching portion C. However, the closest stretching member on the upstream side of the potential regulating member 8 is not limited to the primary transfer member 15. For example, in the case where the primary transfer roller 15 is offset toward and disposed on an upstream side relative to the photosensitive drum 11, a position on the inner peripheral surface of the intermediary transfer belt 6 at a portion corresponding to a portion where the intermediary transfer belt 6 is separated from the photosensitive drum 11 is the upstream stretching portion C.

Further, in this embodiment, the closest stretching member on the downstream side of the potential regulating member 8 is one of the photosensitive drums 11*m*, 11*c*, and 11*k* disposed adjacent to the potential regulating member 8 on the downstream side of the potential regulating member 8 for the primary transfer portions N1*y*, N1*m*, and N1*c*, respectively, for yellow, magenta, and cyan. Further, a position on the inner peripheral surface of the intermediary transfer belt 6 at a portion corresponding to a portion where the intermediary transfer belt 6 is separated from an associated one of the photosensitive drums 11*m*, 11*c*, and 11*k* is the downstream stretching portion D. However, the closest stretching member on the downstream side of the potential regulating member 8 is not limited to the photosensitive drum 11. For example, in the case where the primary transfer roller 15 is offset toward and disposed on the upstream side relative to the photosensitive drum 11, a position on the inner peripheral surface of the intermediary transfer belt 6 at a portion where the intermediary transfer belt 6 is separated from the primary transfer roller 15 is the downstream stretching portion D. Further, in this embodiment, for the most downstream primary transfer portion N1*k* for black, the closest stretching member on the downstream side thereof is the stretching roller (tension roller in this embodiment) 22. Further, a position on the inner peripheral surface of the intermediary transfer belt 6 at a portion where the intermediary transfer belt 6 is separated from the stretching roller 22 is the downstream stretching portion D.

Further, for each of the primary transfer portions N1, as the closest stretching member on the downstream side of the potential regulating member 8, in the case where there is another stretching roller for regulating an attitude of the intermediary transfer belt 6 during the image forming operation, the rectilinear line L and the downstream stretching portion D are defined on the basis of its stretching roller. Further, in the case where not the stretching roller, but a scraper or a brush is contacted to the inner peripheral surface of the intermediary transfer belt 6 for the purpose of cleaning the inner peripheral surface of the intermediary transfer belt 6 or for the like purpose, the scraper or the brush can be regarded as the closest stretching member on the downstream side of the potential regulating member 8 when the scraper or the brush regulates the attitude of the intermediary transfer belt 6. The scraper is constituted by a sheet-like or film-like member in general.

As shown in FIG. 6, the potential regulating member 8 is disposed downstream of and close to the primary transfer portion N1 so as not to contact the primary transfer roller 15 and the photosensitive drum 11 via the intermediary transfer belt 6. At this time, as the upstream end A is closer to the primary transfer portion N1, the above-described electric charge suppressing effect becomes larger. In this embodiment (FIG. 6), the potential regulating member 8 is disposed in a position downstream of the primary transfer portion N1 so that a distance X2 from the primary transfer roller 15 to the upstream end A becomes about 8 mm. Here, the distance X2 is a distance between the rotation center of the primary transfer roller 15 and the upstream end A in a direction along the common tangential line on a side where the plurality of photosensitive drums 11 contact the intermediary transfer belt 6 in the cross section substantially perpendicular to the rotational axis direction of the photosensitive drum 11. That is, in this embodiment, in the direction along the above-described common tangential line, the distance from the rotation center of the primary transfer roller 15 to the upstream end A is shorter than a distance (radius) from the rotation center of the primary transfer roller 15 to an outer circumference of the primary transfer roller 15. The distance X2 is not limited thereto, but may preferably be about 1 to 20 mm, typically about 1 to 10 mm.

Further, in this embodiment, the potential regulating member 8 is pressed against the inner peripheral surface of the intermediary transfer belt 6 by a pressing spring 87 (part (b) of FIG. 3) constituted by a compression coil spring, which is an urging member as an urging means at each of opposing end portions thereof with respect to the longitudinal direction thereof. At this time, the contact portion of the potential regulating member 8 contacting the inner peripheral surface of the intermediary transfer belt 6 is caused to enter the photosensitive drum 11 side relative to the rectilinear line L. By this, even in the case where waving or vibration occurs on the intermediary transfer belt 6 during the image forming operation (during traveling of the intermediary transfer belt 6), the potential regulating member 8 can be more stably contacted to the intermediary transfer belt 6. In this embodiment, a pressing force of the pressing spring 87 is (adjusted) so that each of the upstream end A and the downstream end B of the contact surface 83, which is the contact portion of the potential regulating member 8 with the inner peripheral surface of the intermediary transfer belt 6, is caused to enter the photosensitive drum 11 side relative to the rectilinear line L by about 0.5 mm. Thus, by causing the contact surface 83 of the potential regulating member 8 to enter the photosensitive drum 11 side relative to the rectilinear line L, even in the case where the waving or the vibration occurs on the intermediary transfer belt 6 during the image forming operation (during the traveling of the intermediary transfer belt 6), the potential regulating member 8 can be more stably contacted to the intermediary transfer belt 6. Although the potential regulating member 8 is not limited thereto, an entering amount of the contact surface 83 of the potential regulating member 8 into the rectilinear line L may preferably be about 0.3 to 5 mm, typically about 0.5 to 3 mm. When this entering amount is excessively small, there is a possibility that it becomes difficult for the potential regulating member 8 to be stably contacted to the intermediary transfer belt 6. When the entering amount is excessively large, there is a possibility that stable feeding (conveyance) of the intermediary transfer belt 6 becomes difficult.

Here, in the cross section substantially perpendicular to the rotational axis direction of the photosensitive drum 11, a rectilinear line passing through the upstream end A and the downstream end B of the contact surface 83 is defined as a rectilinear line M. At this time, it is preferable that the rectilinear line M is prevented from crossing a line segment CD of the rectilinear line L. By this, in the case where the contact surface 83 of the potential regulating member 8 is a flat surface, the intermediary transfer belt 6 and the potential regulating member 8 can be surface-contacted to each other more reliably. In the case where the rectilinear line M crosses the line segment CD of the rectilinear line L, there is a possibility that only either one of an end portion of the potential regulating member 8 on the upstream end A side and an end portion of the potential regulating member 8 on the downstream end B side can contact the inner peripheral surface of the intermediary transfer belt 6. In this case, there is a possibility that it becomes difficult to enhance the electric discharge suppressing effect by the surface contact.

Further, in FIG. 6, the potential regulating member 8 is disposed so that the rectilinear line M and the rectilinear line L are substantially parallel to each other, but when the rectilinear line M falls within a range in which the rectilinear line M does not cross the line segment CD of the rectilinear line L, the potential regulating member 8 may be disposed so that the rectilinear line M is inclined relative to the rectilinear line L. For example, the rectilinear line M is inclined relative to the rectilinear line L so that the upstream end A side is closer to the rectilinear line L than the downstream end B side, so that curvature generated on the intermediary transfer belt 6 due to laying of the intermediary transfer belt 6 in the neighborhood of the upstream end A can be made small. Accordingly, this case is advantageous for reduction in possibility of an occurrence of scars on the inner peripheral surface of the intermediary transfer belt 6 due to friction (slide) with the potential regulating member 8.

Incidentally, the contact portion of the potential regulating member 8 with the inner peripheral surface of the intermediary transfer belt 6 is not limited to the flat side. For example, the potential regulating member 8 is constituted by a curved plate curved in a convexly curved shape toward the photosensitive drum 11 side in the cross section substantially perpendicular to the rotational axis direction, and the contact portion of the potential regulating member 8 contacting the inner peripheral surface of the intermediary transfer belt 6 may be convexly curved surface toward the photosensitive drum 11 side. Thus, the contact portion (contact surface) of the potential regulating member 8 contacting the inner peripheral surface has the curved surface, so that it is possible to alleviate stress when the potential regulating member 8 slides with the intermediary transfer belt 6. By using a roller-shaped potential regulating member 8, the contact portion of the potential regulating member 8 contacting the inner peripheral surface of the intermediary transfer belt 6 may also have the curved surface.

Here, in this embodiment, a default value of the potential regulating bias is set in advance depending on the kind of the recording material S. Incidentally, in this embodiment, for each kind of the recording material S, the default value of the potential regulating bias is set depending on an environment (temperature, humidity), and then is stored in the storing portion 35 (ROM 32 or non-volatile memory 34). In this embodiment, for example, in a predetermined environment (for example, normal temperature/normal humidity environment: 23° C./50% RH), for general purpose plain paper (for example, basis weight: 64-75 g/m$^2$), the default value of the potential regulating bias is set to −1500 V.

Further, for example, in the above-described predetermined environment, for the embossed paper, the default value of the potential regulating bias is set to −3000 V. Similarly, in the above-described environment, for the both-side coated paper (for example, basis weight: 106-128 g/m$^2$) or the synthetic paper, the default value of the potential regulating bias is set to −3000 V.

5. Primary Transfer ATVC

Next, control of the primary transfer bias in this embodiment will be described. Incidentally, in this embodiment, the control of the primary transfer bias is similar among the primary transfer portions N1*y*, N1*m*, N1*c*, and N1*k*, and is individually carried out in a synchronous manner. In this embodiment, description will be made by paying attention to a single primary transfer portion.

In this embodiment, in the image forming apparatus 1, a constant voltage is applied to the primary transfer portion N1 (primary transfer roller 15), so that the toner image is transferred from the photosensitive drum 11 onto the intermediary transfer belt 6. Further, in this embodiment, the image forming apparatus 1 employs ATVC (Active Transfer Voltage Control) as a type in which a voltage condition of the primary transfer bias is applied to the primary transfer portion N1 (primary transfer roller 15) during the image formation (during the primary transfer). In the ATVC of the primary transfer portion N1 (herein, also referred to as "primary transfer ATVC"), in order to acquire the primary transfer bias during the image formation (during the primary transfer) depending on a total resistance value of the primary transfer portion N1 constituted by the intermediary transfer belt 6 and the primary transfer roller 15, a voltage current characteristic is acquired using test biases (test voltages, test currents). The primary transfer ATVC is executed by being controlled by the controller 3.

In the primary transfer ATVC, during non-image formation in which there is no toner image in the primary transfer portion N1, a predetermined voltage or a predetermined current is supplied as the test bias from the primary transfer power source 75 to the primary transfer portion N1 (primary transfer roller 15). A setting value of the predetermined voltage or the predetermined current as the test bias is one level or a plurality of levels. Further, when the test bias which is the predetermined voltage is supplied, a current flowing through the primary transfer roller 15 (primary transfer power source 75) is detected by the current detecting sensor 75*b*. Or, when the test bias which is the predetermined current is supplied, a voltage (output voltage of the primary transfer power source 75) applied to the primary transfer roller 15 is detected by the voltage detecting sensor 75*a*. By this, a voltage-current characteristic depending on impedance (total resistance value) of the primary transfer portion N2 is acquired. On the basis of this voltage-current characteristic, a voltage necessary to flow a primary transfer current suitable for primary transfer of the toner depending on the impedance (total resistance value) of the primary transfer portion N1 is calculated. Then, during the image formation (during the primary transfer), the primary transfer bias is applied to the primary transfer roller 15 under constant-voltage control in which the calculated voltage is used as a target voltage.

FIG. 7 is a flowchart of the primary transfer ATVC in this embodiment. Further, FIG. 8 is a graph schematically showing the voltage-current characteristic acquired in the primary transfer ATVC.

When the primary transfer ATVC is started, in a state in which a charging bias similar to the charging bias during the normal image formation is applied to the charging roller 12, the controller 3 causes the primary transfer power source 75 to apply a target voltage (setting voltage V1 determined by the last primary transfer ATVC to the primary transfer roller 15. Then, the controller 3 causes the current detecting sensor 75*b* to acquire a detection current I1 (S101). Incidentally, in the case where there is no target voltage determined by the last primary transfer ATVC, a target voltage V1 determined in advance may only be required to be used. Then, the controller 3 compares the acquired detection current I1 [μA] and a target current I0 [μA] with each other, and discriminates whether or not I1 is I0 or more (I0≤I1) (S102). The target current I0 is stored in the storing portion 35 (ROM 32) after an appropriate value depending on, for example, the environment (temperature, humidity) is acquired on the basis of an experiment or the like in advance. Then, in the case where I1 is not 10 or more, i.e., I1 is less than 10 (I0>I1), the controller 3 causes the power source to apply V2(=V1+α) [V], obtained by adding a predetermined voltage value α [V] to the above-described V1, to the primary transfer roller 15. Then, the controller 3 causes the current detecting sensor 75*b* to acquire a detection current I2 (S103). On the other hand, in the case where I1 is I0 or more (I0≤I1), the controller 3 causes the power source to apply V2(=V1−α) [V], obtained by subtracting the predetermined voltage value α [V] from the above-described V1, to the primary transfer roller 15. Then, the controller 3 causes the current detecting sensor 75*b* to acquire a detection current 12 (S104). FIG. 8 shows an example of the case of I0>I1, and V2=V1+α [V] holds. Next, the controller 3 performs linear interpolation with use of the detection currents 12 and 12, and determines the target voltage V0 corresponding to the target current I0 (S105). Then, during the image formation (during the primary transfer), the primary transfer bias applied to the primary transfer portion N1 (primary transfer roller 15) is subjected to the constant voltage control at the determined target voltage V0.

Incidentally, in the primary transfer ATVC, a test bias subjected to constant-current control at a predetermined current (for example, the target current I0) may be used, or both of the test bias subjected to the constant-current control at the predetermined current and a test bias subjected to constant-voltage control at a predetermined voltage may be used. Here, the constant-current control is control such that output of the power source is adjusted so that a current supplied to a supply object becomes substantially constant at the target current. Further, the constant-voltage control is control such that output of the power source is adjusted so that a voltage applied to an application object becomes substantially constant at a target voltage. Further, the test bias may be one level (for example, the test bias corresponding to the target current I0) or may be three levels or more.

Further, the voltage-current characteristic is not limited to once calculated by linear approximation, but may also be obtained by curve approximation. Further, in this embodiment, the primary transfer ATVC is executed, as during the non-image formation, in the pre-rotation step (or in the post-rotation step). However, the present invention is not limited thereto, but the primary transfer ATVC can be executed, for example, in the paper interval step at a predetermined frequency (every predetermined number of sheets subjected to image formation) during the continuous image formation if the execution timing is during the non-image formation. Further, in this embodiment, also during the non-image formation, similar as during the image formation, the potential regulating bias is applied to the potential regulating member 8 by the constant-voltage control.

As in this embodiment, in the case where the ion-conductive foam rubber is used as the material of the primary transfer member, or in the like case, an electric resistance value of the primary transfer member changes depending on the environment and a use state. When the electric resistance value of the primary transfer member changes, a current necessary to transfer the toner changes, and therefore, there is a need to execute the primary transfer ATVC appropriately. In this embodiment, in the case where the temperature changes from an environment temperature, at the time of execution of the last primary transfer ATVC, by 3° C. or more (increase or decrease by 3° C. or more), the primary transfer ATVC is executed again at a subsequent pre-rotation timing. Further, in this embodiment, in the case where printing of images on 500 sheets is performed after the execution of the last primary transfer ATVC, the primary transfer ATVC is executed again at the subsequent pre-rotation timing. On the other hand, it would be considered that the primary transfer ATVC is executed before every image formation, but in that case, FCOT (First Copy Output Time) becomes long, and therefore, such execution of the primary transfer ATVC is not preferable.

Incidentally, also as regards the secondary transfer portion N2, during the non-image formation in which the toner image and the recording material S are absent in the secondary transfer portion N2, ATVC roughly similar to the above-described primary transfer ATVC (herein, this ATVC is also referred to as “secondary transfer ATVC”) is carried out. In the secondary transfer ATVC, a base voltage (secondary transfer part voltage (shared voltage)) of the secondary transfer bias during the image formation (during secondary transfer) depending on the electric resistance value of the secondary transfer portion N2 (principally the outer secondary transfer roller 25) is acquired. On the basis of this base voltage and a recording material part voltage depending on the kind of the recording material S, a target voltage of the secondary transfer bias during the image formation (during the secondary transfer) is determined. Then, during the image formation (during the secondary transfer), the secondary transfer bias applied to the secondary transfer portion N2 (the outer secondary transfer roller 25) is subjected to the constant voltage control at the determined target voltage. In this embodiment, the secondary transfer ATVC is executed, as during the non-image formation, in the pre-rotation step (or the pre-multiple-rotation step) of the job. However, the present invention is not limited thereto, but the secondary transfer ATVC can be executed, for example, in the paper interval step at a predetermined frequency (every predetermined number of sheets subjected to the image formation) during the continuous image formation if the execution timing is during the non-image formation.

6. Adjustment of Potential Regulating Bias

Next, adjustment (correction) of the potential regulating bias in this embodiment will be described. Incidentally, as regards the recording material S, a leading end and a trailing end refer to the leading end and the trailing end, respectively, with respect to the conveying direction of the recording material S when the recording material S passes through the secondary transfer portion N2 unless otherwise specified.

As described above, in order to suppress the increase in charge amount of the toner on the intermediary transfer belt 6 by suppressing the electric discharge on the side downstream of the primary transfer portion N1, application of the potential regulating bias of the same polarity as the charge polarity of the photosensitive drum 11 to the potential regulating member 8 is effective. By this, for example, uniform transfer of the toner onto the embossed paper with surface unevenness can be made easy. Further, a difference in charge amount of the toner is made small between the secondary color and the single color, or the like, so that the secondary transfer latitude is easily ensured.

However, as described above, in the case where a recording material S, relatively high in electric resistance value, such as the coated paper or the synthetic paper (herein, this paper is also referred to as "high-resistance paper") is used, when the charge amount of the toner on the intermediary transfer belt 6 lowers under application of the potential regulating bias to the potential regulating member 8 and the retaining force of the toner to the intermediary transfer belt 6 lowers, "scattering" and "image disturbance" are liable to occur in some instances.

That is, as described above, in this embodiment, for every kind of the recording material S, for example, a representative one is selected or the like, so that the default value of the potential regulating bias is not set in advance. However, it is assumed that commercially available recording materials S include a recording material different in property from the representative one. For that reason, at the default value of the potential regulating bias, the charge amount of the toner on the intermediary transfer belt 6 becomes excessively low, so that an electrostatic retaining force between the intermediary transfer belt 6 and the toner possibly becomes excessively low. In the case where the recording material S used by the user is the high resistance paper such as the coated paper or the synthetic paper, in order to ensure the secondary transfer property, there is a tendency that the secondary transfer bias is set high (large in absolute value). In this state, when the high resistance sheet is conveyed toward the secondary transfer portion N2, the "scattering" occurs in some cases at a portion where a behavior of the recording material S is unstable, such as a leading end portion or a trailing end portion of the recording material S. This is because an interval between the recording material S and the intermediary transfer belt 6 changes at a portion where a behavior of the recording material S is unstable and thus a magnitude of the electric field exerted on the toner changes, or the like. Further, the "image disturbance" occurs in some cases without being limited to at the leading end portion and the trailing end portion of the recording material S. This is because the intermediary transfer belt 6 and the recording material S slide with each other in a state in which the retaining force of the toner on the intermediary transfer belt 6 lowers.

Part (a) of FIG. 9 is a schematic view showing the scattering occurring at the leading end portion and the trailing end portion of the recording material S in the case where a half-tone image (for example, a half-tone image with an area ratio of 50% at the image portion) is formed on an entire surface of the recording material S. The scattering has a tendency to be liable to be conspicuous in the half-tone image, and typically, a portion where the scattering occurs is visible dark in density compared with a portion where the scattering does not occur. This is because the scattered toner is placed on a position where the toner should be originally placed in the half-tone image. In part (a) of FIG. 9, the reason why a shape of the portion where the scattering occurs is different between the leading end portion and the trailing end portion is due to a difference in attitude and shape (waving) of the recording material S during conveyance. Further, part (b) of FIG. 9 is a schematic view showing the image disturbance occurring at a part of the recording material S in the case where the half-tone image (for example, the half-tone image with the area ratio of 50% at the image portion) is formed on the entire surface of the recording material S. The image disturbance has a tendency to be liable to be conspicuous in the half-tone image, and for a similar reason to the reason in the case of the above-described scattering, typically, the portion where the image disturbance occurs is visible dark in density compared with the portion where the image disturbance does not occur. In part (b) of FIG. 9, the reason why the image disturbance occurs from the leading end to a certain position on the trailing end side of the recording material S and does not occur from the position to the trailing end of the recording material S is that the trailing end of the recording material S passes through the registration roller pair 19 and thus followability of the recording material S to the intermediary transfer belt 6 is improved, or the like.

The "scattering" and the "image disturbance" are influenced by the charge amount of the toner on the intermediary transfer belt 6, and in addition, are liable to be influenced by the kind of the recording material S, an image duty (image ratio, print ratio), and the like. For that reason, it is preferable that a value of the potential regulating bias can be freely adjusted so that the user can obtain a desired effect depending on the kind of the recording material S, a pattern of an image outputted, and the like.

Therefore, in this embodiment, the image forming apparatus 1 is constituted so that the user can adjust the potential regulating bias value. Particularly, in this embodiment, in the image forming apparatus 1, a default value of the potential regulating bias is set in advance depending on the kind of the recording material S. Further, in this embodiment, the image forming apparatus 1 is constituted so that the user can adjust the potential regulating bias value from the default value to a desired value.

FIG. 10 is a flowchart showing an example of procedure in which the user adjusts the potential regulating bias for the recording material S used for the image formation. In this embodiment, the case where the user performs an operation relating to adjustment such as input of an adjusting value in the operating portion 70 of the image forming apparatus 1 or the like operation will be described as an example.

First, the user outputs an image on a prepared recording material S (S201), and checks whether or not the potential regulating bias value set in advance for the recording material S is appropriate (S202).

At this time, before the image is outputted, the user designates the kind of the recording material S corresponding to the kind of the prepared recording material S in a recording material selection screen 200 as shown in part (a) of FIG. 11 displayed at the operating portion 70 (display portion 70*a*). By this, the image is outputted under an image forming condition (a voltage condition of the secondary transfer bias, a voltage condition of the potential regulating bias, a fixing condition, a process speed, and the like) set in advance for the kind of the recording material S. In the recording material selection screen 200 shown in part (a) of FIG. 11, information (paper kind category, basis weight, size, and the like) 201 on the recording material S stored in the storing portion 35 in association with the paper feeding portion 4 (cassette 41 or the like) in advance, and a selection button 202 for selecting the kind of the recording material S used are displayed.

In the case where a secondary transfer bias value set in advance is not optimum, the user performs adjustment of the secondary transfer bias (S203 to S205).

At this time, the user designates the kind of the recording material S for which the user desires to adjust the secondary transfer bias, in a recording material setting screen 300 as shown in part (b) of FIG. 11 displayed at the operating portion 70 (display portion 70*a*), and the sequence goes to adjustment of the secondary transfer bias. In the recording material setting screen 300 shown in part (b) of FIG. 11, an adjusting button 301 is displayed in association with a paper kind category 303 of the recording material S registered in advance in the storing portion 35. The user operates the adjusting button 301 corresponding to the paper kind category of the recording material S for which the user desires to adjust the image forming condition and can proceed to an adjusting screen of the secondary transfer bias. Incidentally, in the recording material setting screen 300 shown in part (b) of FIG. 11, by operating the adjusting button 301, the user can also proceed to an adjusting screen of another image forming condition, such as a potential regulating bias adjusting screen (described later), in addition to the secondary transfer bias adjusting screen. Further, in the recording material setting screen 300 shown in part (b) of FIG. 11, a copy button 302 is provided so that a desired setting can be separately registered while leaving a default setting. For example, in a copied paper kind category 303, the name thereof is registered as another name in the storing portion 35, and the default setting except for the image forming condition changed in setting is held.

The user operates the adjusting button 301 in the recording material setting screen 300, so that a secondary transfer bias adjusting screen 400 as shown in part (a) of FIG. 12 is displayed at the operating portion 70 (display portion 70*a*). In the secondary transfer bias adjusting screen 400 shown in part (a) of FIG. 12, an adjusting value display portion 401 where an adjusting value (offset value) of the secondary transfer bias appears and an adjusting value input portion ((+) button, (−) button) 402 for inputting (changing) the adjusting value are displayed. In this embodiment, each of the adjusting value display portion 401 and the adjusting value input portion 402 is provided for a front surface (image surface in one-side printing, first surface in both-side printing) and a back surface (second surface in the both-side printing). Further, in this secondary transfer bias adjusting screen 400, a determination (OK) button 403 for determining a change in setting and then for storing the change in the storing portion 35, and a cancel button 404 for canceling the change in setting are displayed. The user operates the adjusting value input portion 402, so that the secondary transfer bias (specifically, the recording material part voltage) can be changed from the default value corresponding to an adjusting value of 0 with a predetermined change width (for example, +50 V to +500 V (or −50 V to −500 V) for each adjusting value of +1 (or −1). The adjusting changed by the adjusting value input portion 402 is displayed at the adjusting value display portion 401. Then, the user can determine the change in setting and then can store the change in the storing portion 35 by operating the determination button 403, and can cancel the change in setting by operating the cancel button 404. The user inputs the adjusting value (S203) and repeats output of the image and check of the outputted image (S204), so that an optimum value of the secondary transfer bias can be set (S205). At this time, it is preferable to decide whether or not principally the secondary color can be appropriately transferred.

Incidentally, as the image outputted for adjusting (checking) the secondary transfer bias, the user may use an image which is actually desired to be obtained as a product by the user or may also use an image for adjustment determined in advance. In the case where the secondary transfer bias in formation of images on both surfaces (sides) of the recording material S is adjusted, images for adjusting the secondary transfer bias may only be required to be outputted by the both-side printing using the above-described both-side mechanism 60. In the case where the image which is actually obtained as the product by the user, the user repeats the input of the adjusting value and the output of the image again as described above, so that the optimum value of the secondary transfer bias can be set. In the case where the voltage value of the secondary transfer bias is insufficient, the toner cannot be sufficiently transferred, so that an image density lowers. In the case where the voltage value of the secondary transfer bias is excessive, an image defect such that the toner (image) is not partially transferred due to abnormal electric discharge, or the like, occurs. Further, in the case where the image for adjustment determined in advance is used, the user is capable of outputting an adjusting chart onto which patches (test images, test toner images) of a plurality of representative colors are transferred while switching a voltage value of the secondary transfer bias for each patch.

In this case, the user is capable of causing the image forming apparatus 1 to output the adjusting chart by operating chart output button 405 displayed in the secondary transfer bias adjusting screen 400 as shown in part (b) of FIG. 12. FIG. 13 is a schematic view showing an example of the adjusting chart. In the adjusting chart of FIG. 13, a plurality of solid images of a secondary color (for example, blue) and a plurality of solid images of black are transferred while switching the voltage values of the secondary transfer biases, respectively. For example, the user inputs the adjusting value, printed in association with a patch for which an optimum transfer property (density) is obtained, to the adjusting value display portion 401 in the secondary transfer bias adjusting screen 400.

Next, the user checks whether or not a value of the potential regulating bias set in advance for the recording material S is appropriate and then adjusts the value of the potential regulating bias (S206 to S208).

At this time, first, the user may check whether or not the potential regulating bias value is appropriate by checking the image finally outputted in adjustment of the secondary transfer bias or may also check whether or not the potential regulating bias value is appropriate by checking an image outputted anew.

As described above, the user operates the adjusting button 301 in the recording material setting screen 300 (part (b) of FIG. 11), so that a potential regulating bias adjusting screen 500 as shown in FIG. 14 is displayed at the operating portion 70 (display portion 70*a*). In the potential regulating bias adjusting screen 500 of FIG. 14, an adjusting value display portion 501 where the adjusting B value (offset value) of the potential regulating bias appears and an adjusting value input portion ((+) button, (−) button) 502 for inputting (changing) the adjusting value are displayed. In this embodiment, each of the adjusting value display portion 501 and the adjusting value input portion 502 is provided for the front surface (the image surface of the one-side printing, the first surface of the both-side printing) and the back surface (the second surface of the both-side printing) for each of the image forming units 10 for yellow, magenta, cyan, and black. Further, in the potential regulating bias adjusting screen 500, a determination (OK) button 503 for determining the change in setting and for storing the change in setting in the storing portion 35 and a cancel button 504 for canceling the change in setting are displayed. The user is capable of changing the potential regulating bias from a default value corresponding to the adjusting value of 0 with a change width (for example, +50 V to +500 V (or −50 V to −500 V) for each adjusting value of +1 (or −1) by operating the adjusting value input portion 502. The adjusting value changed by the adjusting value input portion 502 is displayed at the adjusting value display portion 501. Then, the user determines the change in setting by operating the determination button 503 and then can cause the storing portion 35 to store the change in setting and can cancel the change in setting by operating the cancel button 504. The user inputs the adjusting value (offset value) (S206) and repeats output of the image and check of the outputted image (S207), so that the optimum value of the potential regulating bias can be set (S208).

Incidentally, as the image outputted for adjusting (checking) the potential regulating bias, an image which is actually desired to be obtained as a product by the user may be used, or an adjusting image determined in advance may be used. In the case where the potential regulating bias in formation of images on both surfaces of the recording material S is adjusted, by the both-side printing using the above-described both-side mechanism 60, the image for adjusting the potential regulating bias may only be required to be outputted. For example, on the entire surface (which may include a margin) of the recording material S, a half-tone image (for example, a half-tone image with an image ratio of 50% for an image portion) of a single color (each of yellow, magenta, cyan, and black) is outputted. Then, the potential regulating bias is adjusted in the case where the scattering occurs at the leading end portion and the trailing end portion as shown in part (a) of FIG. 9 or in the case where the image disturbance occurs overall (or partially on the leading end side) as shown in part (b) of FIG. 12. That is, in the case where such scattering and image disturbance occur, an absolute value of the potential regulating bias is changed in a decreasing direction. Further, in the case where the scattering and the image disturbance do not occur, the absolute value of the potential regulating bias is changed in an increasing direction, so that the secondary transfer property can be improved in addition to the above-described adjustment of the secondary transfer bias. Then, the user can end adjustment of the potential regulating bias in the case where it was confirmed that as described above, the user inputs the adjusting value and repeats the image output and the check of the outputted image. FIG. 15 is a schematic view showing another example of the adjusting image which can be used for adjusting the potential regulating bias. In the adjusting image of FIG. 15, a band-like half-tone image (for example, a half-tone image with an image ratio of 50% for an image portion) of each of colors of yellow, magenta, cyan, and black is formed. According to such an adjusting image, by a single recording material S, the scattering and the image disturbance for the plurality of colors (all the colors in the example of FIG. 15) can be checked, so that it is possible to realize reduction in number of the recording materials S necessary to adjust the potential regulating bias and alleviation in labor required for adjusting the potential regulating bias.

Further, in the case where the user adjusts the potential regulating bias by using the image which is actually desired to be obtained as the product, it is difficult to obtain a desirable effect by adjusting the potential regulating bias for each of colors of yellow, magenta, cyan, and black in some instances. Therefore, for example, the potential regulating bias may be made adjustable collectively for all the colors of yellow, magenta, cyan, and black. At this time, change widths per predetermined adjusting value for all the colors may be made the same or different from each other. For example, with the toner transferred onto the intermediary transfer belt 6 at a more upstream-side primary transfer portion N1, the number of the primary transfer portions N1 is larger and is more subjected to the electric discharge, so that the charge amount is liable to become larger. For that reason, in the case where the absolute value of the potential regulating bias is changed in the decreasing direction, the change width per predetermined adjusting value of the potential regulating bias can be made smaller with the image forming unit 10 on a more upstream side. Further, in the case where the absolute value of the potential regulating bias is changed in the increasing direction, the change width per predetermined adjusting value of the potential regulating bias can be made larger with the image forming unit 10 on the more upstream side. The change width per predetermined adjusting value of the potential regulating bias can be set by an experiment in advance or the like on the basis of a degree of an increase in charge amount of the toner of each color or the like. FIG. 16 shows an example of the potential regulating bias adjusting screen 500 in this case. The potential regulating bias adjusting screen 500 of FIG. 16 is different from the potential regulating bias adjusting screen 500 of FIG. 14 in that a single adjusting value display portion 501 and a single adjusting value input portion 502 are provided for each of the front surface and the back surface. The user operates the adjusting value input portion 502 and thus is capable of collectively changing the potential regulating bias from a default value corresponding to the adjusting value of 0 for all the colors of yellow, magenta, cyan, and black. At this time, as described above, the change width per adjusting value of +1 (or −1) of the potential regulating bias may be made the same or different from each other for the colors of yellow, magenta, cyan, and black. Further, the change width for at least two colors may be made the same, or the change width for at least one color may be made different from the change width for another color, for example, such that the change width for yellow and magenta and the change width for cyan and black are made different from each other, or the like.

Further, as shown in FIG. 17, the chart output button 505 enabling output of the adjusting image (adjusting chart) of the potential regulating bias by the image forming apparatus 1 as shown in FIG. 15 may be provided in the potential regulating bias adjusting screen 500. By this, there is no need that the user prepares the adjusting image as shown in FIG. 15, so that the user is capable of adjusting the potential regulating bias more easily.

Here, as a method of suppressing the scattering and the image disturbance, it would be considered that the absolute value of the secondary transfer bias is made small. However, in that case, it becomes difficult to ensure a secondary transfer latitude between the single color and the secondary color, so that a setting by which a result desired by the user is obtained cannot be readily formed. For that reason, as the method of suppressing the scattering and the image disturbance, a method of adjusting the potential regulating bias is effective. By adjusting the potential regulating bias, the scattering and the image disturbance can be suppressed while ensuring the secondary transfer latitude.

Thus, in this embodiment, the image forming apparatus 1 includes the photosensitive member 11 chargeable to the predetermined polarity and carrying the toner image, the intermediary transfer belt 6 which forms the primary transfer portion N1 in contact with the photosensitive member 11, which conveys the toner image, primary-transferred from the photosensitive member 11 in the primary transfer portion N1, for being secondary-transferred onto the recording material S in the secondary transfer portion N2, and which is circumferentially movable, the primary transfer member 15 which contacts the inner peripheral surface of the intermediary transfer belt 6 and which is for primary-transferring the toner image from the photosensitive member 11 onto the intermediary transfer belt 6 under application of a first bias (primary transfer bias), a first applying portion 75 for applying the first bias of the opposite polarity to the predetermined polarity, the electrode member (potential regulating member) of contacting the inner peripheral surface of the intermediary transfer belt 6 on the side downstream of the primary transfer portion N1 in the movement direction of the intermediary transfer belt 6, a second applying portion 80 for applying a second bias (potential regulating bias) of the same polarity as the predetermined polarity, the storing portion 35 in which a setting value of the second bias is stored in association with the kind of the recording material S, and the controller 3 for controlling the second applying portion 80 so that during the formation of the image on the recording material S of a predetermined kind, the second bias is applied to the electrode member 8 on the basis of the setting value of the second bias stored in the storing portion 35 in association with the predetermined kind of the recording material S. In this embodiment, the image forming apparatus 1 includes a changing means (operating portion 70, potential regulating bias adjusting screen 500, CPU 31) capable of changing the setting value of the second bias stored in the storing portion 35 in association with the predetermined kind of the recording material S.

Further, in this embodiment, the image forming apparatus 1 includes at least two photosensitive members 11, at least two primary transfer members 15 provided correspondingly to the at least two photosensitive members 11, respectively, and at least two electrode members 8 provided correspondingly to the at least two photosensitive members 11, respectively, and the above-described changing means is capable of independently changing setting values of the second bias, by separate changing instructions, which are stored in the storing portion 35 in association with the predetermined kind of the recording material A and which are applied to the at least two electrode members 8. Further, the changing means may be capable of collectively changing the setting values of the second bias, by a single changing instruction, which are stored in the storing portion 35 in association with the predetermined kind of the recording material S and which are applied to the at least two electrode members 8. In this embodiment, the changing means is constituted by including the adjusting value input portion 502 of the potential regulating bias adjusting screen 500, as the inputting portion for receiving the changing instruction of the setting values of the second bias by the operation by the operator. Incidentally, the image forming apparatus 1 may be constituted so that the operator provides an instruction to change the setting values of the second bias in an external device, and in this case, the above-described changing means may also be constituted by including an output/input circuit (input/output portion) as the input portion for receiving the changing instruction from the external device.

As described above, according to this embodiment, in the constitution in which the increase in charge amount of the toner on the intermediary transfer member is capable of being suppressed by applying the bias to the electrode member disposed downstream of the primary transfer portion, it becomes possible to suppress the image defect such as the scattering capable of occurring depending on the kind of the recording material or the like.

Embodiment 2

Next, another embodiment of the present invention will be described. The basic structure and operation of an image forming apparatus of this embodiment are the same as those of the image forming apparatus of the embodiment 1. Therefore, in the image forming apparatus of this embodiment, elements having the same or corresponding functions or structures as those of the image forming apparatus of the image forming apparatus of the embodiment 1 are denoted by the same reference numerals or symbols as those of the embodiment 1, and detailed description thereof will be omitted.

1. Outline of this Embodiment

This embodiment is different from the embodiment 1 in that in the case where a value of the potential regulating bias is changed, the primary transfer ATVC is always executed before subsequent image formation.

The potential regulating member 8 is provided in contact with the back surface of the intermediary transfer belt 6 so as to be close to a downstream side of the primary transfer portion N1. For that reason, when the value of the potential regulating bias applied to the potential regulating member 8 changes, the changed value of the potential regulating bias has the influence on the value of the primary transfer bias in some instances.

FIG. 18 is a graph showing an example of a relationship between a voltage value (output voltage value of the primary transfer power source 75) of the primary transfer bias and a current value (value of a current flowing through the primary transfer power source 75). In FIG. 18, a broken line represents the case where the potential regulating bias of −1500 V is applied to the potential regulating member 8, a chain line represents the case where the potential regulating bias of −3000 V is applied to the potential regulating member 8, and a solid line represents the case where the potential regulating bias is not applied to the potential regulating member 8 (the potential regulating member 8 is in an electrically floating state). Further, FIG. 18 shows a state in which the charging bias (DC voltage) of −600 V is applied and shows the current value when the primary transfer bias (DC voltage) is applied.

As shown in FIG. 18, when the potential regulating bias is applied to the potential regulating member 8, compared with the case where the potential regulating member is not applied to the potential regulating member 8, even when the primary transfer bias applied to the primary transfer roller 15 is the same, the current flowing through the primary transfer roller 15 becomes large in some instances. This is due to the following reason. When the primary transfer bias is applied to the primary transfer roller 15, in addition to a flow of the current (primary transfer current) into the photosensitive drum 11 side, the current flows into the potential regulating member 8 side. Then, the current flowing into the potential regulating member 8 side changes depending on application or non-application of the potential regulating bias to the potential regulating member 8 or depending on a change in value of the potential regulating bias applied to the potential regulating member 8. In the case where the primary transfer bias is subjected to the constant voltage control, the output voltage of the primary transfer power source 75 is controlled so as to become substantially constant, and therefore, when the current flowing into the potential regulating member 8 side becomes large, the current flowing through the primary transfer power source 75 becomes large. In other words, when the primary transfer bias is controlled so that the same target current flows through the primary transfer power source 75, the current (primary transfer current) flows toward the photosensitive drum 11 side in actuality. For that reason, in the case where the value of the potential regulating bias is adjusted, when the image formation is executed while not executing the primary transfer ATVC, the image defect due to improper primary transfer occurs in some cases. For example, there is a possibility that a primary transfer efficiency lowers in the case where an amount of the output flowing into the potential regulating member 8 becomes large when an absolute value of the primary transfer bias applied to the potential regulating member 8 becomes large or when an impedance of the primary transfer portion N1 is low.

FIG. 19 is a flowchart showing an example of a procedure for adjusting the potential regulating bias in this embodiment. The contents of the procedure of S301 to S307, and S309 in FIG. 19 are similar to the contents of the procedure of S201 to S207, and S208 in FIG. 10, respectively. As shown in S307, in the case where the user changed the adjusting value (offset value) of the potential regulating bias, before the image formation is subsequently carried out, the primary transfer ATVC is executed. Specifically, in the case where the adjusting value of the potential regulating bias is changed, before an image (the image which is actually desired to be obtained by the user or the adjusting image) is subsequently formed, the controller 3 carries out control so as to execute the primary transfer ATVC.

2. Correction Control of Primary Transfer Bias

Next, a method of more accurately adjusting the primary transfer bias in the case where the predetermined bias value is changed will be further described. As described above, in this embodiment, as regards the target voltage of the potential regulating bias, the default value depending on the environment (temperature, humidity) is set in advance for each kind of the recording material S. Then, the potential regulating bias is subjected to the constant voltage control at the target voltage during the image formation or during the primary transfer ATVC. By the influence or the like of an individual difference in resistance value of each of the intermediary transfer belt 6, the primary transfer roller 15, and the potential regulating member 8, the value of the current flowing toward the potential regulating member 8 side as described above due to a change in environment (such as an increase in temperature inside the image forming apparatus 1) or a change in potential regulating bias changes for each individual of the image forming apparatus 1 or for each use status of the image forming apparatus 1 in some instances.

FIG. 20 is a schematic view showing currents around the primary transfer portion N1. For example, when a target current Ia is supplied from the primary transfer power source to the primary transfer roller 15, in the case where the potential regulating member 8 is not provided, the target current Ia and an effective transfer current I1 flowing in the photosensitive drum 11 direction substantially coincide with each other. However, by disposing the potential regulating member 8 downstream of the primary transfer portion N1, a current path from the primary transfer roller 15 is branched to the effective transfer current and an advection current I2 flowing in the potential regulating member 8 direction. In the primary transfer ATVC, a target voltage of an execution bias Vtr for causing a target current depending on a total resistance value of the primary transfer portion N1 to flow is determined. At this time, the advection current I2 toward the potential regulating member 8 is fluctuated by the influence of the above-described resistance fluctuation or the like. For that reason, in the case where the primary transfer ATVC is carried out without considering this advection current I2 toward the potential regulating member 8, an actual effective transfer current I1 decreases, so that a primary transfer property is impaired in some instances. Accordingly, by correcting the primary transfer bias by taking the current flowing from the primary transfer portion N1 toward the potential regulating member 8 into consideration, the primary transfer current flowing in the photosensitive drum 11 direction can be maintained more accurately to an appropriate value.

FIG. 21 is a block diagram showing a schematic constitution of a control system of the image forming apparatus 1 in this case. The constitution shown in FIG. 21 is schematically similar to the constitution shown in FIG. 2. However, in the constitution shown in FIG. 21, to the potential regulation power source 80, a voltage detecting sensor 80*a* as a voltage detecting means (voltage detecting portion) for detecting an output voltage thereof and a current detecting sensor 80*b* as a current detecting means (current detecting portion) for detecting an output current thereof are connected.

Further, FIG. 22 is a timing chart showing progression of voltage values and current values of the primary transfer bias and the potential regulating bias for illustrating primary transfer bias correction control in this case. The controller 3 makes correction of the primary transfer bias when the primary transfer ATVC is executed.

In a state in which the potential regulating bias is applied to the potential regulating member 8, the controller 3 detects the current value of the current flowing through the potential regulating member 8 (potential regulation power source 80) when a test bias is not applied to the primary transfer roller 15 and when the test bias is applied to the primary transfer roller 15. Then, the controller 3 makes correction of the primary transfer bias on the basis of the detected current values.

That is, drive of the intermediary transfer belt 6 is started, so that a pre-rotation step is started (T1). Thereafter, application of the potential regulating bias from the potential regulation power source 80 to the potential regulating member 8 under constant voltage control is started (T2). Then, before the test bias is applied to the primary transfer roller 15, a current value Ib1 flowing through the potential regulating member 8 is detected by the current detecting sensor 80*b*. Thereafter, the primary transfer ATVC is started, and the test bias is applied from the primary transfer power source 75 to the primary transfer roller 15 under the constant current control in order to realize the target current I1 (T3).

The target current I1 at this time corresponds to a target current of the primary transfer bias depending on the environment during the image formation. Then, as described above, the execution bias Vtr is determined. Incidentally, as described above, in the primary transfer ATVC, application of test biases of three levels to the primary transfer roller 15 is made, but in FIG. 22, for simplification, only the test bias aiming at the target current under the constant current control is shown. The execution bias Vtr determined in this case is influenced by a fluctuation in current Ib1 flowing through the potential regulating member 8 as described above. By this, there is a possibility of deviation between the target current Ia and an actual effective transfer current I1.

Therefore, a current value Ib2 of the current flowing through the potential regulating member 8 when the test bias is applied to the primary transfer roller 15 is detected by the current detecting sensor 80*b*. Further, a difference A1 (=|Ib1−Ib2|) between the current value Ib1 detected when the test bias is not applied to the primary transfer roller 15 and the current value Ib2 detected when the test bias is applied to the primary transfer roller 15 is acquired. Then, this difference ΔI is regarded as the advection current I2, and this difference Δ1 is added to the target current I1 of the test bias, so that the target current Ia is determined. Further, on the basis of a voltage-current characteristic acquired by the ATVC, an execution bias Vtr' corrected correspondingly to the target current Ia is determined. During the image formation, the determined execution bias Vtr' after the correction is applied to the primary transfer roller 15 under the constant-voltage control (T4 to T5).

Incidentally, the primary transfer bias is subjected to the constant voltage control, and therefore, the voltage value corresponding to the target current Ia is determined, but the present invention is not limited thereto. For example, in the case where the primary transfer bias is subjected to the constant-current control, it is only required that the target current Ia is determined as described above and during the image formation, the primary transfer bias is subjected to the constant-current control at the determined target current Ia. Further, as the current flowing through the potential regulating member 8 when the test bias is applied, a current when the test bias which corresponds to the target current and which is determined in advance is applied is detected, but the present invention is not limited thereto. For example, the execution bias Vtr which is determined on the basis of the voltage-current characteristic acquired under application of test bias of a plurality of levels and which corresponds to the target current is applied against as the test bias, and a current flowing through the potential regulating member 8 at that time may be detected. Further, in this embodiment, the potential regulating bias applied to the potential regulating member 8 during the image formation was subjected to the constant-voltage control, but the potential regulating bias may be subjected to the constant-current control. In that case, the primary transfer bias may only be required to be determined on the basis of detection voltages in the case where the test bias is applied to the primary transfer roller 15 in the primary transfer ATVC and in the case where the test bias is not applied to the primary transfer roller 15 in the primary transfer ATVC.

Thus, in this embodiment, the controller 3 is capable of carrying out control so that in the case where a predetermined condition is satisfied, a setting operation (primary transfer ATVC) for setting the first bias applied to the primary transfer member 15 by the first applying portion 75 during the image formation under application of the test bias to the primary transfer member 15 by the first applying portion 75 during the non-image formation is executed. Further, in this embodiment, when the change in setting value of the second bias (primary transfer) by the changing means is not made after first image formation and before second image formation subsequent to the first image formation, even in the case where the above-described setting operation is not executed during the non-image formation before the second image formation, the controller 3 carries out control so as to execute the above-described setting operation during the non-image formation before the second image formation when the change in setting value of the second bias by the changing means is made after the first image formation and before the second image formation.

As described above, according to this embodiment, an effect similar to the effect of the embodiment 1 is obtained, and in addition, it is possible to suppress a change in primary transfer property due to adjustment of the potential regulating bias.

Other Embodiments

As described above, the present invention was described based on specific embodiments, but is not limited to the above-described embodiments.

In the above-described embodiments, the predetermined charge polarity of the photosensitive member was the negative polarity, but is not limited thereto. The predetermined charge polarity of the photosensitive member may also be the positive polarity. Similarly, in the above-described embodiments, the normal charge polarity of the toner was the negative polarity, but may also be the positive polarity. Various applied voltages in the case where the predetermined charge polarity of the photosensitive member and the normal charge polarity of the toner are the positive polarity may only be required to be appropriately changed such that these polarities are changed to the polarity opposite to the polarity in the above-described embodiments in accordance with the above-described embodiments.

Further, the photosensitive member is not limited to a drum-shaped one (photosensitive drum), but may also be an endless belt-like one (photosensitive belt), or the like.

Further, the image forming apparatus is not limited to the image forming apparatus capable of forming a full-color image, but may also be an image forming apparatus capable of forming only a monochromatic (white/black or monocolor) image.

Further, in the above-described embodiments, the display and the operations which were described as being performed by the operating portion of the image forming apparatus may also be performed by the external device.

Further, in the above-described embodiments, description was made such that the adjustment of the secondary transfer bias is also made when the adjustment of the potential regulating bias is made, but it is also possible to make the adjustment of the potential regulating bias.

Further, in the above-described embodiments, the case where the adjustment of the secondary transfer bias and the adjustment of the potential regulating bias are made from the default values was described as an example, but in the case where these biases have already been adjusted from the default values, it is also possible to make adjustment from a present setting.

Further, in the above-described embodiments, each of the primary transfer bias and the secondary transfer bias was subjected to the constant-voltage control, but at least one of these biases may also be subjected to the constant-current control.

Further, in the above-described embodiments, as the half-tone image, the half-tone image with the area ratio of 50% for the image portion was used as an example, but the half-tone image may also be an arbitrary half-tone image with the area ratio (ratio of a toner application amount to the solid image) of, for example, about 30% to about 80% for the image portion.

Further, in the above-described embodiments, the voltage applied to the potential regulating member (electrode member) during the image formation was subjected to the constant-voltage control, but the voltage applied to the potential regulating member (electrode member) may also be subjected to the constant-current control.

Further, in the image forming apparatus, information on the environment (installation environment of the image forming apparatus) used for various pieces of control may be information on at least one of a temperature and a humidity on at least one of an inside and an outside of the image forming apparatus.

According to the present invention, in a constitution in which the increase in charge amount of the toner on the intermediary transfer member is capable of being suppressed under application of the electrode member disposed downstream of the primary transfer portion, it becomes possible to suppress the image defect such as the scattering capable of occurring depending on the kind of the recording material, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-110364 filed on Jul. 4, 2023, which is hereby incorporated by reference herein in its entirety.

What is claimed is:

1. An image forming apparatus comprising:
- a photosensitive member electrically charged to a predetermined polarity and configured to carry a toner image;
- an intermediary transfer belt onto which the toner image is transferred from the photosensitive member in a primary transfer portion;
- a primary transfer member forming the primary transfer portion, where the photosensitive member and the intermediary transfer belt contact each other, in contact with an inner peripheral surface of the intermediary transfer belt and configured to transfer the toner image from the photosensitive member onto the intermediary transfer belt under application of a transfer bias;
- an electrode member contacting the inner peripheral surface of the intermediary transfer belt on a side downstream of the primary transfer portion with respect to a movement direction of the intermediary transfer belt;
- a first applying portion configured to apply, to the primary transfer member, a bias of a polarity opposite to the predetermined polarity;
- a second applying portion configured to apply, to the electrode member, a bias of the same polarity as the predetermined polarity; and
- a controller configured to control the second applying portion so as to change the bias applied to the electrode member on the basis of a kind of a recording material.

2. An image forming apparatus according to claim 1, further comprising:

- a storing portion configured to store a setting value of a bias applied to the electrode member in association with the kind of the recording material; and
- an operating portion to which an instruction for changing the setting value, of the bias applied to the electrode member, stored in the storing portion in association with the kind of a predetermined recording material is capable of being manually inputted.

3. An image forming apparatus according to claim 2, further comprising:
- at least two photosensitive members;
- at least two primary transfer members provided correspondingly to the at least two photosensitive members, respectively; and
- at least two electrode members provided correspondingly to the at least two photosensitive members, respectively.

4. An image forming apparatus according to claim 3, wherein the operating portion is capable of independently changing setting values, of biases applied to the at least two electrode members, stored in the storing portion in association with the kind of the predetermined recording material, by separate change instructions.

5. An image forming apparatus according to claim 3, wherein the operating portion is capable of collectively changing setting values, of biases applied to the at least two electrode members, stored in the storing portion in association with the kind of the predetermined recording material, by a single change instruction.

6. An image forming apparatus according to claim 2, wherein in a case that a predetermined condition is satisfied, during non-image formation, the controller is capable of carrying out control so as to execute a setting operation for setting the bias of the polarity opposite to the predetermined polarity to the first primary transfer member by the first applying portion during image formation under application of a test bias to the first primary transfer member by the first applying portion, and
- wherein in a case that the change in setting value of the bias, applied to the electrode member, by the operating portion is made, the controller carries out control so as to execute the setting operation after the setting value is changed and before subsequent image formation is carried out.

7. An image forming apparatus comprising:
- a photosensitive member electrically charged to a predetermined polarity and configured to carry a toner image;
- an intermediary transfer belt onto which the toner image is transferred from the photosensitive member in a primary transfer portion;
- a primary transfer member forming the primary transfer portion, where the photosensitive member and the intermediary transfer belt contact each other, in contact with an inner peripheral surface of the intermediary transfer belt and configured to transfer the toner image from the photosensitive member onto the intermediary transfer belt under application of a transfer bias;
- an electrode member contacting the inner peripheral surface of the intermediary transfer belt on a side downstream of the primary transfer portion with respect to a movement direction of the intermediary transfer belt;
- a first applying portion configured to apply, to the primary transfer member, a bias of a polarity opposite to the predetermined polarity;

a second applying portion configured to apply, to the electrode member, a bias of the same polarity as the predetermined polarity; and an operating portion to which an instruction for changing a setting value of the bias applied to the electrode member during formation of an image on a predetermined recording material is capable of being manually inputted.

8. An image forming apparatus according to claim 7, further comprising:

at least two photosensitive members;

at least two primary transfer members provided correspondingly to the at least two photosensitive members, respectively; and at least two electrode members provided correspondingly to the at least two photosensitive members, respectively.

9. An image forming apparatus according to claim 8, wherein the operating portion is capable of independently changing setting values, of biases applied to the at least two electrode members, stored in a storing portion in association with the kind of the predetermined recording material, by separate change instructions.

10. An image forming apparatus according to claim 8, wherein the operating portion is capable of collectively changing setting values, of biases applied to the at least two electrode members, stored in a storing portion in association with the kind of the predetermined recording material, by a single change instruction.

11. An image forming apparatus according to claim 8, wherein in a case that a predetermined condition is satisfied, during non-image formation, the controller is capable of carrying out control so as to execute a setting operation for setting the bias of the polarity opposite to the predetermined polarity to the first primary transfer member by the first applying portion during image formation under application of a test bias to the first primary transfer member by the first applying portion, and wherein in a case that the change in setting value of the bias, applied to the electrode member, by the operating portion is made, the controller carries out control so as to execute the setting operation after the setting value is changed and before subsequent image formation is carried out.

* * * * *